United States Patent
Brown et al.

(10) Patent No.: US 10,608,819 B1
(45) Date of Patent: Mar. 31, 2020

(54) PORTABLE STORAGE DEVICE WITH INTERNAL SECURE CONTROLLER THAT PERFORMS SELF-VERIFICATION AND SELF-GENERATES ENCRYPTION KEY(S) WITHOUT USING HOST OR MEMORY CONTROLLER AND THAT SECURELY SENDS ENCRYPTION KEY(S) VIA SIDE CHANNEL

(71) Applicant: APRICORN, Poway, CA (US)

(72) Inventors: Paul Cameron Brown, San Diego, CA (US); Roy Walter Younggren, Escondido, CA (US)

(73) Assignee: APRICORN, Poway, CA (US)

( * ) Notice: Subject to any disclaimer, the term of this patent is extended or adjusted under 35 U.S.C. 154(b) by 0 days.

(21) Appl. No.: 16/581,693

(22) Filed: Sep. 24, 2019

(51) Int. Cl.
*H04L 9/32* (2006.01)
*H04L 9/08* (2006.01)

(52) U.S. Cl.
CPC .......... *H04L 9/3226* (2013.01); *H04L 9/0861* (2013.01); *H04L 9/0891* (2013.01); *H04L 9/0897* (2013.01); *H04L 9/3215* (2013.01)

(58) Field of Classification Search
CPC ... H04L 9/3226; H04L 9/3215; H04L 9/0897; H04L 9/0891; H04L 9/0861
See application file for complete search history.

(56) References Cited

U.S. PATENT DOCUMENTS

| 6,016,402 | A | 1/2000 | Thomas |
| 6,757,783 | B2 | 6/2004 | Koh |

(Continued)

FOREIGN PATENT DOCUMENTS

| CN | 102246455 | 11/2011 |
| EP | 2453346 | 5/2012 |

(Continued)

OTHER PUBLICATIONS

"GPIB Hardware, Installation Guide and Specifications," retrieved from http://www.ni.com/pdf/manuals/370426r.pdf, National Instruments, Jun. 2015, 46 pages.

(Continued)

*Primary Examiner* — Mohammed Waliullah
(74) *Attorney, Agent, or Firm* — Morgan, Lewis & Bockius LLP

(57) ABSTRACT

Highly secure portable storage device may include a security controller, a data transfer controller and a memory controller. The security controller self-verifies, without a host, an access code. After the verification, the security controller may retrieve a concealed encryption key and a transformation key that were previously self-generated by the security controller. The encryption keys are not generated by the host, a user, or the memory controller. The transformation key is sent to the memory controller via a side channel during a first time period. The concealed encryption key is sent to the memory controller via the side channel during a different time period. After extracting an operating encryption key, the memory controller may notify the data transfer controller to initiate an enumeration process with the host. Data transfer from and to the host is performed via interfaces different from the side channel. Other methods and implementations are also described.

20 Claims, 7 Drawing Sheets

(56) References Cited

U.S. PATENT DOCUMENTS

| | | |
|---|---|---|
| 7,237,046 B2 | 6/2007 | Paley |
| 7,739,732 B2 | 6/2010 | Camilli |
| 8,069,281 B2 | 11/2011 | Ikemoto |
| 8,351,821 B2 | 1/2013 | Asahara |
| 8,484,736 B2 | 7/2013 | Hahn et al. |
| 8,572,362 B2 | 10/2013 | Castillo |
| 9,009,816 B2 | 4/2015 | Hamid |
| 9,043,613 B2 | 5/2015 | Shapiro |
| 9,081,911 B2 | 7/2015 | Powers |
| 9,081,946 B2 | 7/2015 | Fruhauf |
| 9,177,153 B1 | 11/2015 | Perrig et al. |
| 9,268,961 B2 | 2/2016 | Okamoto |
| 9,342,713 B2 | 5/2016 | Ali et al. |
| 9,354,898 B1 | 5/2016 | Luttmann et al. |
| 9,424,017 B2 | 8/2016 | MacKen et al. |
| 9,720,700 B1 | 8/2017 | Brown et al. |
| 10,142,304 B2 | 11/2018 | Secatch et al. |
| 10,387,333 B2 | 8/2019 | Chun et al. |
| 2002/0073340 A1 | 6/2002 | Mambakkam |
| 2002/0184485 A1 | 12/2002 | Dray et al. |
| 2005/0066129 A1 | 3/2005 | Chang et al. |
| 2007/0023499 A1 | 2/2007 | Wurzburg |
| 2007/0106764 A1 | 5/2007 | Mansfield |
| 2008/0005415 A1 | 1/2008 | Lopez et al. |
| 2008/0209262 A1 | 8/2008 | Maity |
| 2008/0250172 A1 | 10/2008 | Tanaka |
| 2009/0200371 A1 | 8/2009 | Kean |
| 2009/0217304 A1 | 8/2009 | Shih et al. |
| 2009/0240881 A1 | 9/2009 | Halloush |
| 2009/0327743 A1 | 12/2009 | Finlayson et al. |
| 2011/0258456 A1 | 10/2011 | Lyakhovitskiy |
| 2012/0079289 A1 | 3/2012 | Weng |
| 2012/0093318 A1 | 4/2012 | Obukhov |
| 2012/0331202 A1 | 12/2012 | Cohen et al. |
| 2013/0097340 A1 | 4/2013 | Chen |
| 2013/0167226 A1 | 6/2013 | Lin |
| 2014/0245427 A1 | 8/2014 | Nagai |
| 2014/0297953 A1 | 10/2014 | Beck et al. |
| 2014/0330993 A1 | 11/2014 | Raz |
| 2017/0277916 A1 | 9/2017 | Natarajan et al. |
| 2018/0357406 A1* | 12/2018 | Bolotin ............... G06F 21/43 |
| 2019/0007203 A1* | 1/2019 | Bolotin ............... H04W 12/02 |

FOREIGN PATENT DOCUMENTS

| | | |
|---|---|---|
| EP | 2876574 | 5/2015 |
| EP | 2761804 B1 | 7/2019 |
| KR | 20040111472 | 12/2004 |
| WO | WO 2005/050910 | 6/2005 |
| WO | WO 2007/023657 | 3/2007 |

OTHER PUBLICATIONS

"How to flip the removable bit on USB flash drives?", https://www.cnet.com/forums/discussions/how-to-flip-the-removable-bit-on--usb-flash-drives-569542/, Aug. 5, 2012, 13 pages.

"NVM Express Management Interface," retrieved from https://nvmexpress.org/wp-content/uploads/NVM-Express-Management-Interface-1.1-Ratified.pclf, Apr. 29, 2019, Revision 1.1, 151 pages.

"PHY Interface for the PCI Express, SATA, USB 3.1, DisplayPort, and Converged IO Architectures," Intel Corporation, © 2007-2019, Version 5.2, 166 pages.

"Universal Serial Bus 3.1 Specification," Hewlett-Packard Company, Revision 1.0, Jul. 26, 2013, 631 pages.

"USB stick appearing as hard disk drive, not removable storage device", https://superuser.com/questions/117563/usb-stick-appearing-as-hard-disk-d-rive-not-removable-storage-device, last edited Aug. 21, 2017, 7 pages.

ThinkPad USB 3.0 Secure Hard Drive User Guide, Aug. 2013, 36 pages.

UKLA, Version 3.4 User Manual, 2014, 48 pages.

User Manual DL3 Configurator v. 1.32.6 Windows Client, Feb. 2014, 14 pages.

DL3 Configurator and Encrypted External Hard Drive, retrieved from web on Dec. 21, 2016, 9 pages.

Remote Management Suite and Local Administrator, retrieved from web on Dec. 21, 2016, 4 pages.

* cited by examiner

PORTABLE STORAGE DEVICE WITH INTERNAL SECURE CONTROLLER THAT PERFORMS SELF-VERIFICATION AND SELF-GENERATES ENCRYPTION KEY(S) WITHOUT USING HOST OR MEMORY CONTROLLER AND THAT SECURELY SENDS ENCRYPTION KEY(S) VIA SIDE CHANNEL

TECHNICAL FIELD

The present description relates in general to computer-based storage devices, and more particularly to, for example, without limitation, a portable storage device with an internal secure controller that can self-verify an access code and self-generate encryption key(s) without using a host or an internal memory controller and that may securely provide the encryption key(s) via a side channel.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
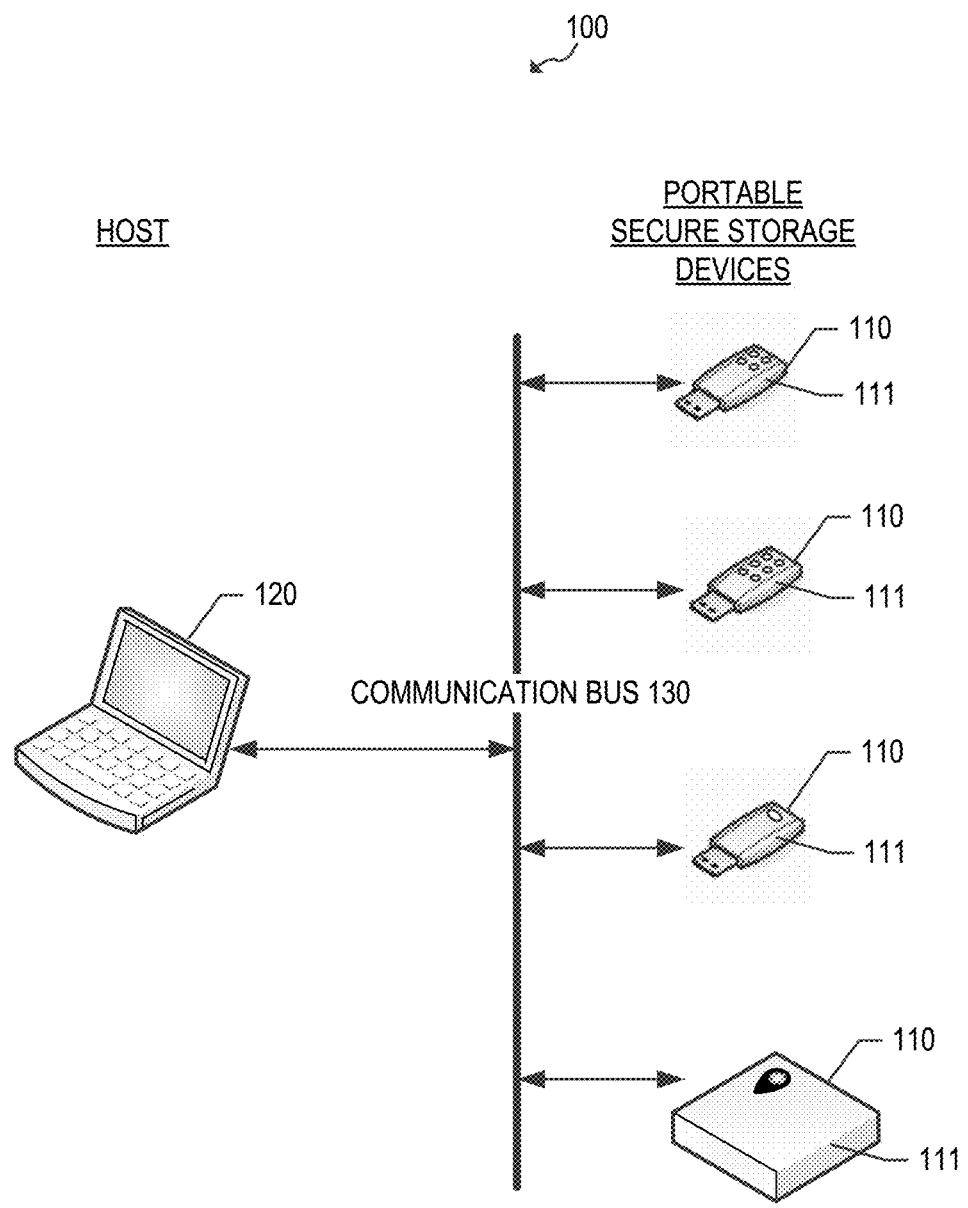
FIG. 1 illustrates an example of architecture for a host and portable storage devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more advantageous implementations, a portable secure storage device provides a highly secure, host-free, scalable, cross-platform compatible solution. The portable secure storage device implements multiple controllers, one of which may have a higher security level than other components. The controller with the higher security level generates the encryption key(s) prior to an operational mode. These encryption key(s) are not generated or provided by a host, a user or any other controllers within the portable secure storage device. A concealed encryption key is retained only in the controller with the higher security level. During run-time, the concealed encryption key may be provided securely to a memory controller of the portable secure storage device, via a side channel, to encrypt and decrypt data to and from a mass storage device of the portable secure storage device. The concealed encryption key is deleted from the memory controller when the portable secure storage device becomes locked. The portable secure storage device does not provide any encryption keys to a host or outside the portable secure storage device.

The portable secure storage device does not require any host control, software or input for its normal operation or management (e.g., to lock or unlock the device, to authenticate the device, or to encrypt or decrypt data to or from a mass storage memory). The portable secure storage device is self-authenticated using its own input device and its own controller, all of which reside within or on the portable secure storage device itself. The portable secure storage device does not use a host for authentication. During a normal operational mode, the portable secure storage device, rather than a host, receives a security access code from a user via the device's own input device. The portable secure storage device determines whether the security access code matches with an access code securely stored within the device, without using any input, instruction or data from a host. Thus, the portable secure storage device itself, rather than the host, receives and processes the security access code. The security access code is maintained only within the portable secure storage device and is not shared with the host. As there is no host involvement in the encryption key generation/management process or the authentication process, the risk of software hacking can be substantially circumvented.

As the portable secure storage device uses standard interfaces and standard protocols (e.g., a universal serial bus (USB)) and as it does not require any special software or driver on the host for its normal operation, the portable secure storage device is cross-platform compatible (e.g., PCs, Mac®, Linux, or any operating system (OS) with a powered USB port and a storage file system). Utilizing standard interfaces allows the portable secure storage device to be scalable to provide higher bandwidth, speed and/or storage capacity.

The subject technology addresses challenges arising in the realm of computer technology by providing a solution rooted in hardware and firmware, for example, by providing a portable secure storage device with an internal security controller that can self-authenticate and self-generate encryption key(s) securely, in each case without the use of a host or a memory controller of the portable secure storage device used to encrypt and decrypt user data. By enabling the portable secure storage device to self-authenticate and self-generate the encryption key(s) in such a manner and not sharing the access code or the encryption keys with a host, the subject technology can greatly enhance security of the portable secure storage device. On the host side, no special software or driver is required, thereby improving the performance of the host by eliminating installation and execution overhead of such extra software.

FIG. 1 illustrates an example of architecture for a host and secure storage devices suitable for practicing one or more implementations of the disclosure. The architecture shown in FIG. 1 is for illustration purposes, and other architecture implementations and methods are within the scope of the disclosure. The architecture 100 includes a host 120 and portable secure storage devices 110 connected over a communication bus 130.

The host 120 is operable to connect to the portable secure storage devices 110. In some aspects of the present technology, the host 120 may be a computer with a general-purpose operating system. In other aspects of the present technology, the host 120 may be an embedded system. Multiple portable secure storage devices 110 can be connected to the host 120 over a common data terminal (e.g., the communication bus 130).

The host 120 can be, for example, a desktop computer, a personal computer (PC), a server, a mobile computer, a tablet computer (e.g., an e-book reader), a mobile device (e.g., a smartphone or personal digital assistant (PDA)), or any other type of devices or systems having appropriate processor, memory, and communications capabilities for connecting to the portable secure storage device(s) 110. The host 120 may include one or more computing devices. The host 120 may include an input device 216 and an output device 214. The host 120 may connect to portable secure storage devices 110 for reading and writing images, sounds, videos, and other data.

The portable secure storage device 110 can be a storage device having appropriate processor, memory, and communications capabilities for storing secure data, serving as a secure data back-up, and/or transferring secure data. The secure data may be accessible by various computing devices including the host 120 over the communication bus 130. A device 110 may be sometimes referred to as a drive or a memory apparatus. For example, a portable secure storage device 110 may represent a portable hard disk drive, a portable solid-state drive, a flash memory key, an encased portable storage device, an encased portable secure storage device, a portable storage device, or another storage device.

The communication bus 130 can include or can be a part of, for example, any one or more of a universal serial bus (USB), IEEE 1394, Ethernet, serial ATA, and/or any other type of communication bus, communication interface or communication port. A communication bus may be referred to as a communication channel, a communication medium, or vice versa. Further, the communication bus 130 can include, but is not limited to, any one or more of the following network topologies, including a bus network, a star network, a ring network, a mesh network, a star-bus network, tree or hierarchical network, or any other suitable type of network.

Figure 2:
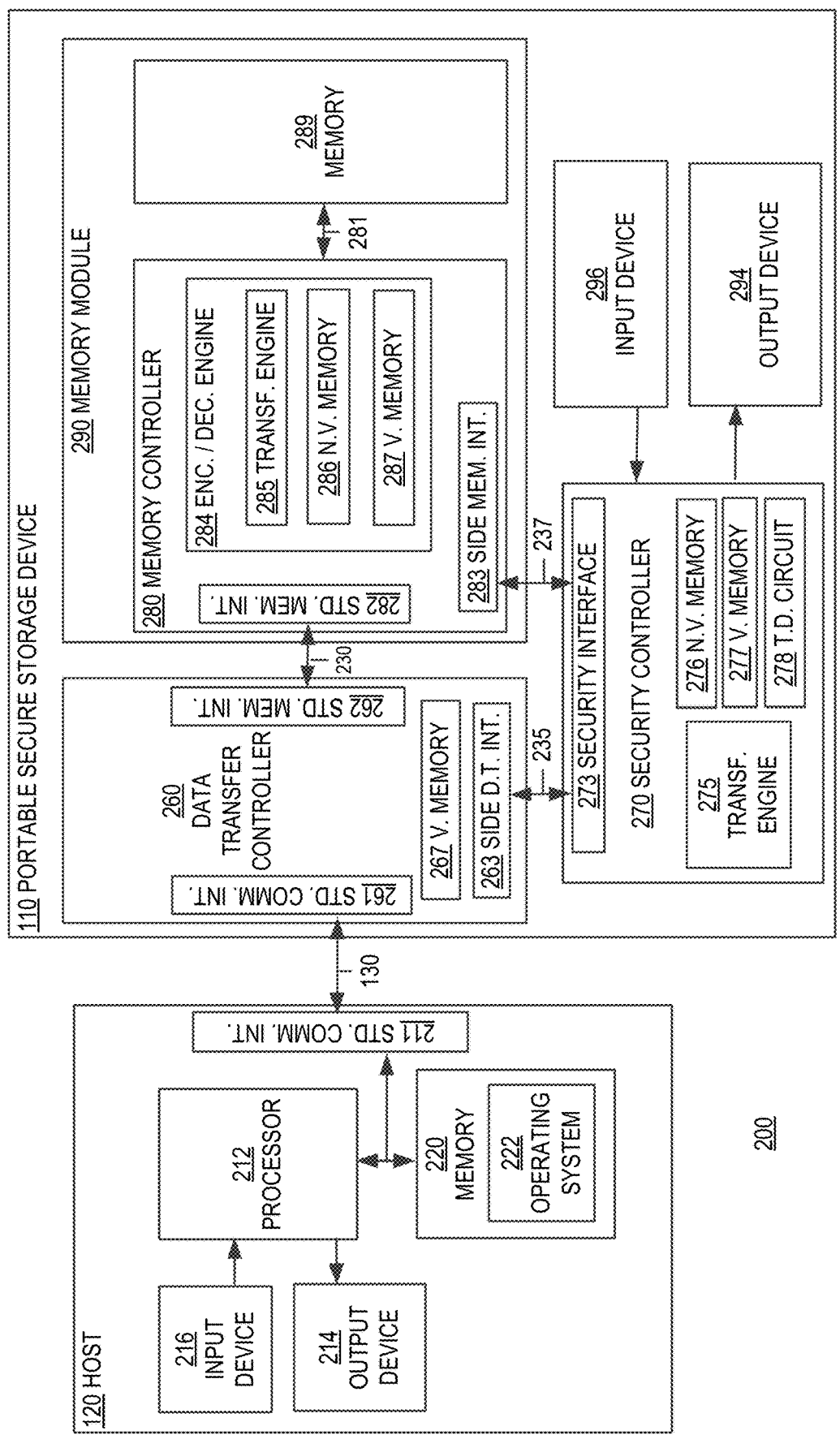
FIG. 2 is a block diagram illustrating an example of a host and a portable storage device.

FIG. 2 is a block diagram illustrating an example of a system including a portable secure storage device and a host. The system shown in FIG. 2 is for illustration purposes, and other systems and methods are within the scope of the disclosure. A system 200 may include a host 120 and a portable secure storage device 110 connected over a communication bus 130 via respective standard communication interfaces 211 and 261.

The standard communication interfaces 211 and 261 are configured to interface with the communication bus 130 to send and receive information, such as data, requests, responses, and commands between the host 120 and the portable secure storage device 110. The standard communication interfaces 211 and 261 can be, or can be a part of, for example, serial bus connectors or interfaces. The standard communication interfaces 211 and 261 may be referred to as, or may include, network interfaces or communication interfaces. In one or more examples, the standard communication interface 211 and the communication bus 130 may be a part of a USB. In one example, the standard communication interface 261 may be a part of a USB connector. The standard communication interface 211 and the communication bus 130 may be a part of a USB port(s). The USB connector may be connected to the USB port. In one example, each of the standard communication interfaces 211 and 261 and the communication bus 130 is a wired communications module or bus. In another example, each of the standard communication interfaces 211 and 261 and the communication bus 130 may be a wireless communications module or bus. In one or more implementations, the standard communication interfaces 211 and 261 and the communication bus 130 may include, or be part of, a wireless interface(s), a wireless port(s), a wireless medium/media, and/or a wireless channel(s) to allow wireless communications between a host and a portable secure storage device(s)).

The host 120 includes a processor 212 and a memory 220. The memory 220 may be a read-and-write memory, a read-only memory, a volatile memory, a non-volatile memory, or a combination of some or all of the foregoing. The memory 220 of the host 120 includes an operating system 222, which may be a general-purpose operating system or an embedded operating system. The memory 220 may also include one or more applications (not shown). From the memory 220, the processor 212 may retrieve instructions to execute and data to process in order to execute the processes of the subject disclosure. The processor 212 can be a single processor, multiple processors, or a multi-core processor in different implementations.

The portable secure storage device 110 may include a memory 289 and several controllers including a data transfer controller 260, a security controller 270, and a memory controller 280. A memory module 290 of the portable secure storage device 110 may include the memory controller 280 and the memory 289. The portable secure storage device 110 may further include an input device 296 and an output device 294. The input device may be referred to as a physical input device, a physical key input device, or a key input device. The output device may be referred to as a physical output device.

In one or more implementations, the portable secure storage device 110 includes a casing (e.g., 111 as illustrated in FIG. 1) or a housing. The casing may be, for example, a metal-based casing (e.g., aluminum) or a hardened plastic material. The casing may be made of multiple parts. In one or more implementations, the memory 289 and each of the controllers 260, 270 and 280 are disposed within the casing.

The memory 289 is configured to store secure data (e.g., encrypted data). The memory 289 may be, or may include, a read-and-write memory, a read-only memory, a volatile memory, a non-volatile memory, registers, or a combination of some or all of the foregoing. In some aspects, the memory 289 is a non-volatile memory unit that stores and retains data even when the portable secure storage device 110 is powered off. The memory 289 may include one or more memories. In one example, the memory 289 may include one or more of a flash memory, a hard drive, a solid-state drive, or some combination thereof. In an example, the memory 289 may include not-and (NAND) flash memories. In one or more implementations, the memory 289 is a mass storage device. For example, the memory 289 may store 2 gigabytes (GB) to 16 terabytes (TB) of user data or more. In one aspect, the memory 289 is the largest memory in the portable secure storage device 110. A memory 289 may be implemented with 3-dimensional (3-D) multi-level cell (MLC)/triple-level cell (TLC) memory technologies with various capacities. The memory 289 may be communicably coupled to the memory controller 280 via a bi-directional communication channel 281. The memory controller 280 may support, for example, open NAND flash interface (ONFI)/toggle memory interfaces and 3-D MLC/TLC memory technologies.

The physical input device 296 enables a user to communicate information and select commands to the portable secure storage device 110. For example, the physical input device 296 may receive a security access code (e.g., one or more of an administrator personal identification number (PIN), a user PIN, a self-destruct PIN and/or a combination thereof) from a user to facilitate unlocking of the portable secure storage device. The security access code may also facilitate authentication of the user. The physical input device 296 may receive other control input to control the operation of the portable secure storage device. For instance, the physical input device 296 may receive a control input from a user (e.g., generated by the user pressing a button or a sequence of buttons) to place the secure storage device 110 into a primary mode or an operational mode (e.g., ready for reading and/or writing data from or into the memory 289).

The physical input device 296 may include any acoustic, speech, visual, touch, tactile and/or sensory input device, such as a keypad, a switch, a jumper, a pointing device, a dial, a sensor device (e.g., a biometric sensor, a finger sensor, biometric iris recognition sensor), or a touchscreen. In one or more implementations, the physical input device 296 is disposed on or at the casing (e.g., an outer surface of the casing) so that a user can access the physical input device. Having a physical input device on the portable secure storage device itself allows a user to securely access the device or prevent access to the device and to place the portable secure storage device 110 into a different mode without using an external system, such as a host computer or host software. The physical input device 296 is configured to receive an input provided by a user. In one or more implementations, the input includes one or more keypad entries, a switch setting, a jumper setting, a biometric-based entry, a touch gesture entry, or a combination thereof. To prevent accidental inputs, one or more components of physical input device 296 may be recessed or hidden under a cover.

The physical output device 294 may be disposed on or at the casing (e.g., an outer surface of the casing) and configured to display an indication of the operation of the portable secure storage device 110. Such indication may be controlled by the security controller 270. The output device 294 may enable, for example, the display or output of visual or audible signaling by the security controller 270. The indication may signal, for example, whether the portable secure storage device 110 is locked, unlocked, completed with enumeration, busy writing or reading data, connected to a host, in a primary mode, or in an operational mode. The output device 294 may include any visual, auditory, tactile, and/or sensory output device to allow a user to detect an indication of the operation of the portable secure storage device 110. For example, the output device 294 may include one or more multicolored light emitting diodes (LEDs) with color tinted light guides. One or more implementations may include a device(s) that functions as both an input and output device, such as a touchscreen. An input device 296 may be a portion of an input and output device. An output device 294 may be a portion of an input and output device.

The standard communication interface 261 of the portable secure storage device 110 is configured to connect the portable secure storage device 110 to the communication bus 130 external to the casing. A type of the standard communication interface 261 may be a USB (e.g., USB-A, USB-B, USB-C, mini-USB, micro-USB or USB 3). These are examples, and the standard communication interface 261 is not limited to these examples. The standard communication interface 261 may be, for example, disposed partially within the casing and partially outside the portable secure storage device 110. In one or more examples, the standard communication interface 261 is coupled to and protrudes from the casing.

In one or more implementations, the portable secure storage device 110 includes a battery(ies) (not shown) that may power the portable secure storage device 110 or a portion(s) thereof. In one example, the battery(ies) may power the security controller 270 (or a portion(s) thereof), the physical input device 296, and/or the physical output device 294. The battery(ies) may be rechargeable, for example, by using bus or line power. In another implementation, the portable secure storage device 110 does not include a battery. In one example, the battery(ies) do not power the memory module 290 and/or the data transfer controller 260.

Still referring to FIG. 2, in one or more implementations, the security controller 270 is coupled to and controls the data transfer controller 260 and the memory controller 280. In one or more aspects, the security controller 270 acts as a master, and the data transfer controller 260 and the memory controller 280 act as slaves. The security controller 270 may provide instructions to prevent or allow data transfer between the portable secure storage device 110 and an external system (e.g., the host 120). In one or more aspects, a security controller 270 may provide peripheral support for a USB, a serial peripheral interface bus (SPIbus), a universal asynchronous receiver-transmitter (UART) interface, an inter-integrated circuit (I2C) interface, a general-purpose input/output (GPIO) interface, or a combination thereof.

In one example, a controller is a single controller. In another example, a controller includes multiple controllers (e.g., two controllers or more than two controllers). A controller may be sometimes referred to as a microcontroller, a multi-core controller, a controller module, a processor, a processor module, a microprocessor, a microprocessor module, or a portion(s) thereof or vice versa. A controller(s) within a controller may be sometimes referred to as a microcontroller(s). A microcontroller may include one or more microcontrollers. When a controller has multiple microcontrollers, each microcontroller may perform different functions, and a microcontroller may be implemented with a different level of security protection (e.g., a high, medium, or low security level). Such security level may be implemented in hardware, firmware, or a combination thereof.

A controller (e.g., controller 260, 270 or 280) may be a single integrated circuit (IC) chip (or a single die) or may include multiple IC chips. A controller(s) may be implemented on a printed circuit board (PCB). A PCB may include other components (e.g., memories and interfaces) besides a controller(s). Multiple controllers within a controller may be on a single chip. Multiple controllers within a controller may be on separate chips.

In one or more implementations, a controller (e.g., 270) is not a general-purpose processing device. In one or more implementations, a controller includes one or more application-specific digital signal processors or one or more application-specific integrated circuits. In one or more implementations, a controller may include discrete hardware components or other suitable components that can perform the functions described herein. In one or more examples, a controller (e.g., 270) is implemented in hardware and embedded firmware (without high-level software applications).

In one or more implementations, a controller (e.g., controller 260, 270 or 280) includes one or more local memories (e.g., 267, 276, 277, 286, 287). A local memory may be a read-and-write memory, a read-only memory, EEPROM, registers, a volatile memory, a non-volatile memory, or a combination of some or all of the foregoing. A local memory may be a single memory or multiple memories. A memory may include one or more memories. When a controller includes multiple microcontrollers and multiple memories, each microcontroller may have its associated local memory(ies). Such local memory(ies) may reside within its corresponding microcontroller. Such local memory(ies) may reside outside its corresponding microcontroller. A memory may be implemented with a different level of security protection. The security level may be implemented in hardware, firmware, or a combination thereof.

A local memory may be configured to store instructions and/or data, including parameters, flags, and/or information. From a local memory or memories, a controller (e.g., controller 260, 270 or 280) may retrieve instructions to execute and/or data to process in order to execute the processes of the subject disclosure.

In one or more implementations, all instructions/data (e.g., configuration data, other data, indications, keys, instructions, parameters, flags and information) stored in the portable secure storage device 110 is encrypted or securely stored. In one or more other implementations, some instructions/data (e.g., a portion or some of configuration data, other data, indications, keys, instructions, parameters, flags and/or information) stored in the portable secure storage device 110 is encrypted or securely stored. In one or more yet other implementations, some instructions/data (e.g., configuration data, other data, indications, keys, instructions, parameters, flags and/or information) stored in the portable secure storage device 110 is not encrypted. In one or more implementations, the user data stored in the memory 289 is encrypted or securely stored.

Figure 3A:
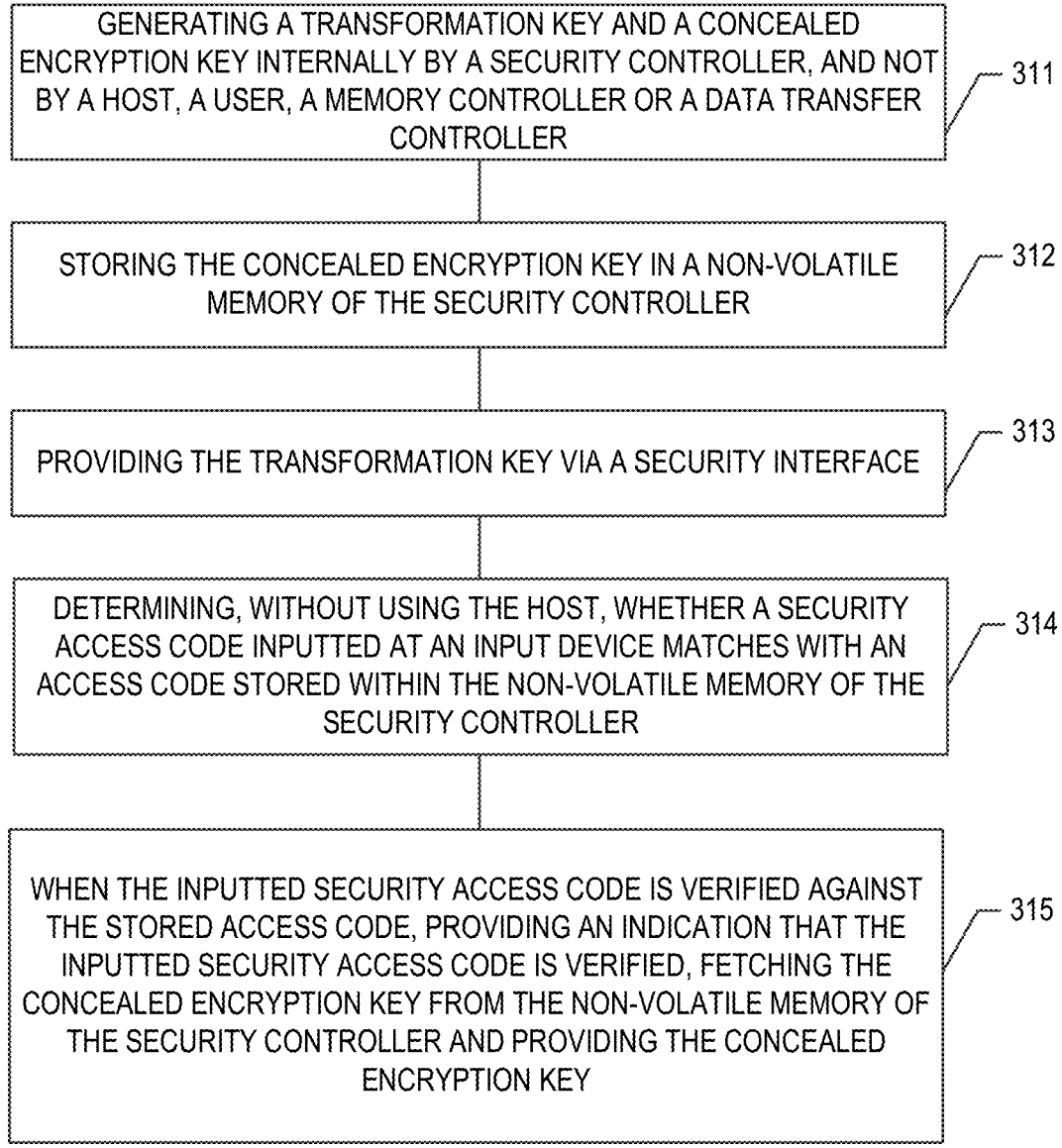
FIG. 3A illustrates an example of operations performed by a security controller of a portable storage device.
Figure 3B:
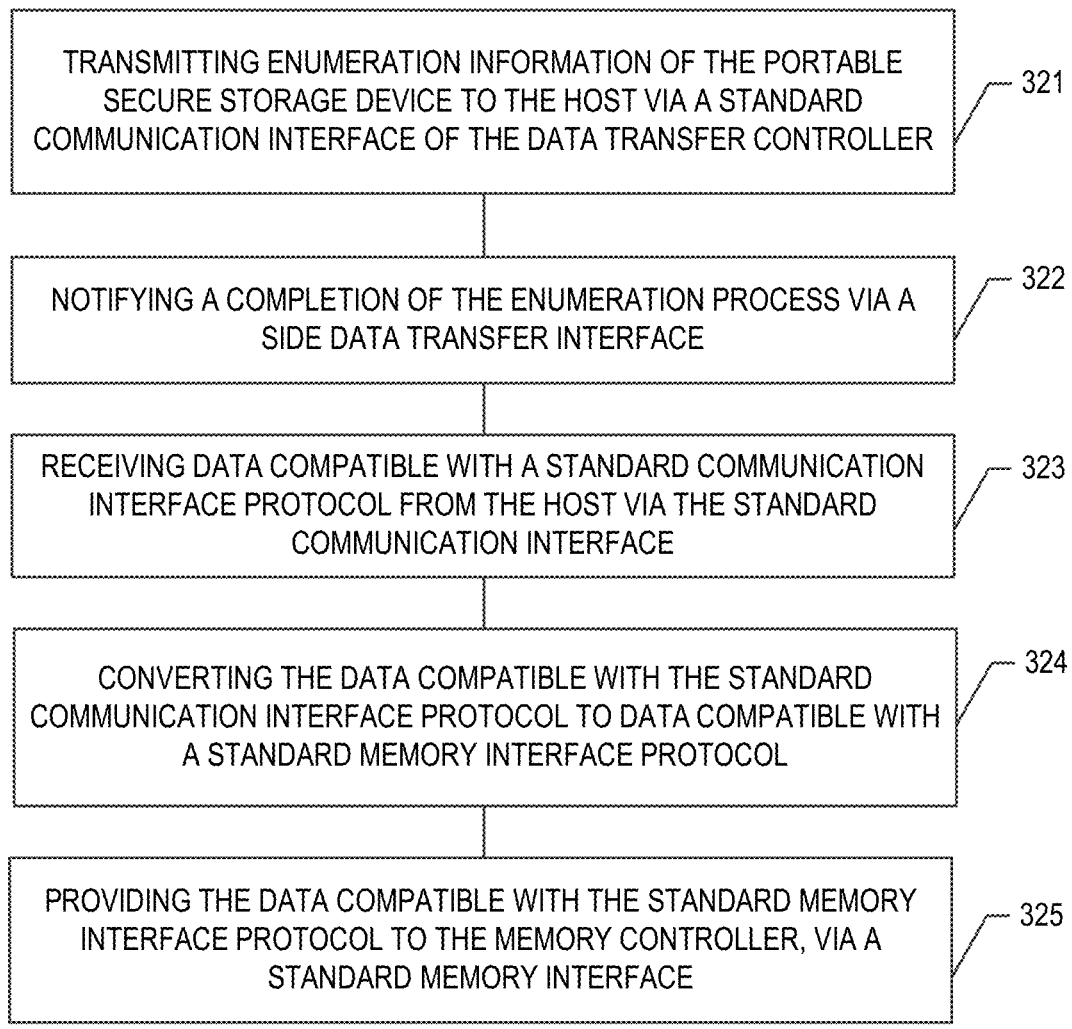
FIG. 3B illustrates an example of operations performed by a data transfer controller of a portable storage device.
Figure 3C:
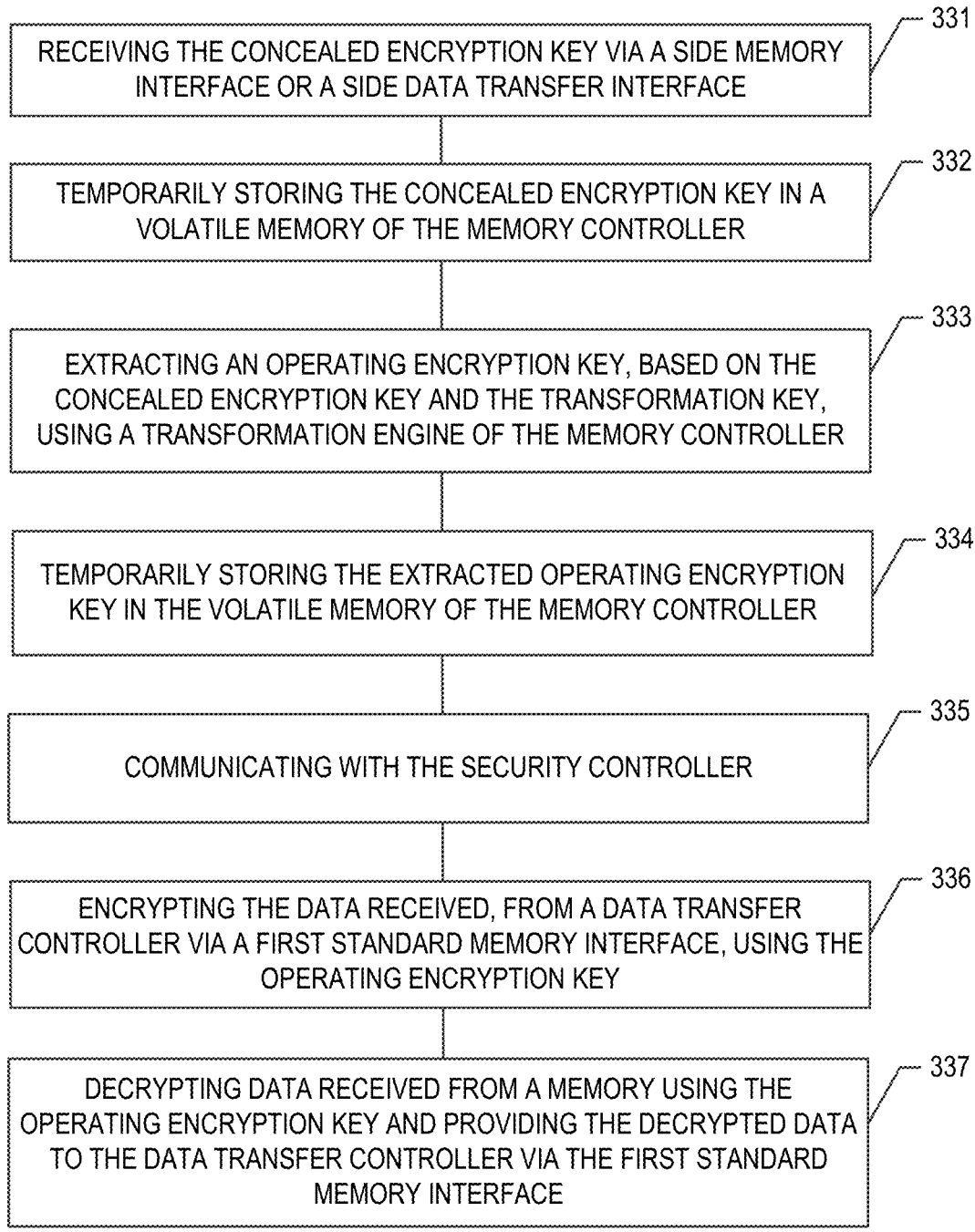
FIG. 3C illustrates an example of operations performed by a memory controller of a portable storage device.

FIG. 3A illustrates an example of operations performed by a security controller. FIG. 3B illustrates an example of operations performed by a data transfer controller. FIG. 3C illustrates an example of operations performed by a memory controller. The operations shown in FIGS. 3A through 3C are for illustration purposes, and other operations are within the scope of the disclosure. Below descriptions are provided while referring to FIGS. 2 and 3A through 3C.

In one or more implementations, the security controller 270 may include a security interface 273, a transformation engine 275, a non-volatile memory 276, a volatile memory 277 and a tamper detection circuit 278. The security controller 270 may also include a true random number generator (not shown) and a battery-backed real-time clock (not shown). In a primary mode (prior to an operational mode), the security controller 270 may generate a transformation key and a concealed encryption key internally within the portable secure storage device 110 (see, e.g., block 311 in FIG. 3A).

In one or more implementations, a primary mode is different from an operational mode. An operational mode is a mode to perform a normal operation (e.g., reading and writing data) with respect to the memory 289. In this mode, the security controller 270 may already contain encryption keys. In this mode, the security controller 270 may contain a valid access code (or a hash value or an encrypted value thereof), such as a valid administrator PIN or a valid user PIN.

In an operational mode, the security controller 270 may receive a security access code inputted at the input device 296, and determine whether the inputted security access code matches with the access code stored in the security controller 270. When the inputted security access code is verified, the security controller 270 may, among others, provide the verification indication and the concealed encryption key.

In one or more examples, a primary mode may be an initial set-up mode after a portable secure storage device mode is manufactured prior to any use, or a renewed primary mode after a portable secure storage device has been deployed. A renewed primary mode may be requested or initiated by a user or an administrator. When a valid administrator PIN or a valid user PIN has been stored in a non-volatile memory 276 of a security controller, a portable secure storage device may be placed into an operational mode.

The security controller 270 may generate all new encryption keys, none of which is usable to decrypt any data previously stored in the memory 289 (i.e., stored in the memory 289 prior to generating the new encryption keys). In one or more implementations, during a primary mode, before an operational mode, before the input device 296 receives a security access code, and/or before the portable secure storage device 110 communicates with the host 120, the security controller 270 may generate a new operating encryption key and a new transformation key. The security controller 270 may temporarily store the operating encryption key in the volatile memory 277. The security controller 270 (e.g., the transformation engine 275) may generate a new concealed encryption key using or based on the transformation key and the operating encryption key. The security controller 270 may store the concealed encryption key in the non-volatile memory 276 (see, e.g., block 312 in FIG. 3A). The security controller 270 may also store the transformation key in the non-volatile memory 276. The security controller 270 may generate new encryption key(s) (e.g., an operating encryption key and a transformation key) using a true random number generator.

The operations of generating and storing the encryption keys as described above may be performed in the primary mode. In one or more aspects, while a user may enter an input or press one or more buttons at an input device 296 to instruct the portable secure storage device 110 to be placed into a primary mode, the user does not generate or provide any encryption key or any portion thereof to the device 100.

Furthermore, in one or more advantageous aspects, the encryption keys (e.g., the operating encryption key, transformation key, and concealed encryption key) are newly generated without receiving any such keys from the host 120 or a user and without receiving a command from the host 120 instructing the device 100 to generate any such keys by the device 110. In one or more advantageous aspects, the encryption keys (e.g., the operating encryption key, the transformation key and the concealed encryption key) are newly generated only by the security controller 270. The security controller 270 has the highest security level among the components in the portable secure storage device 110. The security controller 270 is separate and distinct from the memory controller 280.

The encryption keys are not newly generated by the memory controller 280 and are not newly generated by any other components in the portable secure storage device 110

(e.g., the data transfer controller 260, the input device 296, the output device 294 or the memory 289). The memory controller 280 uses the encryption keys for encrypting or decrypting data to or from the memory 289. In one aspect, the security level of the security controller 270 is higher than the security level of the memory controller 280 or the data transfer controller 260.

When the portable secure storage device 110 is caused to be locked, the security controller 270 deletes any encryption key(s) stored in the volatile memory 277 (e.g., the operating encryption key) and may retain any encryption key(s) stored in the non-volatile memory 276 (e.g., the concealed encryption key and the transformation key). The retained keys may be re-used when the portable secure storage device 110 is permitted to be accessed again (e.g., when a security access code inputted is verified) during an operational mode.

The operating encryption key is to be used to encrypt data to be stored into the memory 289 and to decrypt data read from the memory 289 during an operational mode. The transformation engine may be a mathematical operation(s), a mathematical function(s) or an algorithm that can convert or encrypt an operating encryption key into a concealed encryption key or that can convert or decrypt a concealed encryption key into an operating encryption key. A transformation key can be used to protect the concealed encryption key and can be used to encrypt or decrypt encryption keys such as the concealed encryption key and the operating encryption key. In one aspect, an operating encryption key is used directly to encrypt or decrypt data from or to a host 120 and a memory 289. In one aspect, a concealed encryption key is not used directly to encrypt or decrypt data from or to a host 120 and a memory 289.

In one or more implementations, the security controller 270 provides the transformation key to the memory controller 280 via the security interface and via a side memory interface 283 (see, e.g., block 313 in FIG. 3A). In one aspect, the transformation key is provided during a primary mode.

In one type of primary mode, the security controller 270 may generate and have new encryptions keys, as described herein. In another type of primary mode, the security controller 270 may also nullify or invalidate all access codes, if any, stored in the security controller 270 (e.g., the non-volatile memory 276). As a result, in this primary mode, the portable secure storage device 110 does not contain any valid access code to be used to compare against a security access code inputted at the input device 296, where such comparison is to facilitate unlocking the portable secure storage device 110 after the portable secure storage device 110 is locked. For example, if the input device 296 is a keypad having only alphanumeric keys, a nullified access code may contain one or more characters, symbols or other items that are not alphanumeric; hence, no security access code entered via the alphanumeric keypad can match any nullified access code in the security controller 270. In one aspect, none of the nullified access codes contains all zeros. In one aspect, the nullified access codes are not default values. In an aspect, no input received at the input device 296 is capable of being matched with a nullified access code. A nullified access code or a portion thereof is not enterable at the input device 296. A nullified access code is not representable by any input entered or enterable at the input device 296.

In yet another type of primary mode, the security controller may also convert configuration settings of the portable secure storage device 110 that are not access codes (e.g., settings for auto-lock, brute force attempt, self-destruct, lock-override, key press led indicator, drive format, etc.) to their predetermined values (e.g., default values).

When the portable secure storage device 110 is in a primary mode without a valid access code, the security controller 270 may permit a new security access code to be entered (e.g., via the input device 296). When the access code is accepted and stored as a new valid access code, the portable secure storage device 110 is no longer in the primary mode. At this time, the portable secure storage device 110 is placed into an operational mode.

In an operational mode, the input device 296 may receive a security access code (e.g., an administrator PIN or a user PIN). The security controller 270 may determine whether the received security access code matches with an access code stored within the non-volatile memory 276 of the security controller 270 (see, e.g., block 314 in FIG. 3A). When the received security access code is verified against the stored access code, the security controller 270 may provide an indication that the security access code is verified. In addition, the security controller 270 may fetch the concealed encryption key from the non-volatile memory 276. The security controller 270 may then provide to the memory controller 280 the concealed encryption key via the security interface and via the side memory interface 283 (see, e.g., block 315 in FIG. 3A). When the portable secure storage device 110 is locked, the concealed encryption key and the access code may be retained in the non-volatile memory 276. If the transformation key is stored in the non-volatile memory 276, and when the portable secure storage device 110 is locked, the transformation key is also retained in the non-volatile memory 276.

The security controller 270 may include various security protections such as a die shield protection and a tamper detection circuit. The components of the security controller 270 may be encased with a hardened epoxy compound to prevent physical access to the controller. The tamper detection circuit may detect security tampering (e.g., physical or electrical) of the security controller 270. In one or more aspects, a security level of the security controller 270 is higher than a security level of the memory controller 280 and a security level of the data transfer controller 260.

In one or more implementations, the data transfer controller 260 may include the standard communication interface 261, a standard memory interface 262, local memories including a volatile memory 267, and a side data transfer interface 263.

In one aspect, during an operational mode, after a security access code inputted at the input device 296 is verified, the data transfer controller 260 may transmit enumeration information of the portable secure storage device 110 via the standard communication interface 261 and the standard communication interface 211 (see, e.g., block 321 in FIG. 3B).

In one or more aspects, enumeration may be a process of having a device attached to the host 120, such as the portable secure storage device 110, detected and identified. In one or more implementations, enumeration information may include a product identifier, a vendor identifier, a device descriptor, a configuration description, and an interface descriptor. In one example, enumeration information includes USB enumeration information, which may include, for example, a USB product ID, USB vendor ID, USB device type, USB device class, USB device speed, USB device descriptor, etc. In one or more implementations, enumeration information is not settable or changeable by a user. In one or more implementations, enumeration information is permanent information describing a device.

After an enumeration process with the host 120 is completed, the data transfer controller 260 may notify the completion of the enumeration process to the security controller 270 via the side data transfer interface 263 and the security interface 273 (see, e.g., block 322 in FIG. 3B). In one aspect, the data transfer controller 260 may notify the completion of the enumeration process to other components (e.g., the memory controller 280). In one aspect, after the enumeration process is completed, the host 120 and the portable secure storage device 110 may be ready to exchange data (e.g., commands, user data, other data).

The standard communication interfaces 211 and 261 are of one type of physical interface (e.g., USB-C), and may use a standard communication interface protocol (e.g., USB 3.1 generation 2 (Gen2)) compatible or usable with the interfaces 211 and 261. The data transfer controller 260 may receive data compatible with the standard communication interface protocol from the host 120 via the standard communication interfaces 211 and 261 (see, e.g., block 323 in FIG. 3B). The data transfer controller 260 may then convert the received data to data that is compatible with a standard memory interface protocol (e.g., non-volatile memory express (NVMe), or NVMe revision 1.3c) (see, e.g., block 324 in FIG. 3B). The converted data may then be provided to the memory controller 280 via the standard memory interface 262 and a standard memory interface 282 (see, e.g., block 325 in FIG. 3B). The memory controller 280 may encrypt the data and store the encrypted data in the memory 289 (see, e.g., block 336 in FIG. 3C). In one aspect, the data transfer controller 260 provides a driverless solution for the memory module 290. While the standard communication interfaces 211 and 261 are of one type of physical interface, the standard memory interfaces 262 and 282 are of another type of physical interface (e.g., a peripheral component interconnect express (PCIe), or PCIe Gen3×2) that is different from the standard communication interfaces 211 and 261.

In one or more implementations, the memory controller 280 may include the standard memory interface 282, the side memory interface 283, an encryption/decryption engine 284, a transformation engine 285, a non-volatile memory 286 and a volatile memory 287. The memory controller 280 may also include a data compression/decompression block and an error correction code (ECC) encoding/decoding block. The encryption/decryption engine 284 may include, for example, an advanced encryption standard (AES) 128/256 encryption/decryption engine.

In one aspect, during an operational mode, after a security access code inputted at the input device 296 is verified, the memory controller 280 may receive the concealed encryption key from the security controller via the side memory interface 283 or the side data transfer interface (see, e.g., block 331 in FIG. 3C). In one advantageous implementation, the memory controller 280 securely receives the concealed encryption key via the security interface 273 and the side memory interface 283. In another implementation, the memory controller 280 may receive the concealed encryption key via the security interface 273, the side data transfer interface 263, and the standard memory interfaces 262 and 282.

The memory controller 280 may temporarily store the concealed encryption key in the volatile memory 287 (see, e.g., block 332 in FIG. 3C). The memory controller 280 may extract the operating encryption key, based on the concealed encryption key and the transformation key, using the transformation engine 285 (see, e.g., block 333 in FIG. 3C). In one aspect, the security controller 270 has previously generated the operating encryption key, the concealed encryption key and the transformation key, as described above, for example, during a primary mode. The memory controller 280 may then extract (or derive) the operating encryption key based on the concealed encryption key and the transformation key provided by the security controller 270 to the memory controller 280. In one or more aspects, the memory controller 280 does not generate any new encryption keys (i.e., does not newly generate any operating encryption key, any concealed encryption key or any transformation key).

The transformation engine 285 may have a similar functionality as the transformation engine 275 except in reverse, and the transformation engine 285 is not used to create a new encryption key. While the transformation engine 275 generates a new concealed encryption key based on a new transformation key and a new operating encryption key, the transformation engine 285 extracts the operating encryption key (that has been previously generated by the security controller 270) based on the concealed encryption key and the transformation key provided by the security controller 270. The memory controller 280 may temporarily store the extracted operating encryption key in the volatile memory 287 (see, e.g., block 334 in FIG. 3C). When the portable secure storage device 110 is caused to be locked, the memory controller 280 deletes the encryption keys stored in the volatile memory 287 (e.g., the concealed encryption key and the operating encryption key), and may retain any encryption key(s) stored in the non-volatile memory 286 (e.g., the transformation key).

In one or more implementations, the memory controller 280 may communicate with the security controller 270 via the side memory interface 283 and via the security interface 273 (see, e.g., block 335 in FIG. 3C). The memory controller 280 may provide status and other information (e.g., successfully completing the extraction of the operating encryption key, busy performing encryption/decryption, busy accessing the memory 289 for writing/reading) to the security controller 270 via the side memory interface 283.

The memory controller 280 may receive data from the data transfer controller 260 via the standard memory interfaces 262 and 282 (e.g., commands/data originated from the host 120). The memory controller 280 may then encrypt the data received from the data transfer controller 260 using the operating encryption key and provide the encrypted data to the memory 289 (see, e.g., block 336 in FIG. 3C). The memory controller 280 may also decrypt data received from the memory 289 using the operating encryption key and provide the decrypted data to the data transfer controller 260 via the standard memory interfaces 282 and 262 (see, e.g., block 337 in FIG. 3C). The memory controller 280 may be, for example, compliant with PCIe Gen3 (8 gigabytes/second (Gb/s))×4 lane standard and compliant with PCIe 3.1 as well as NVMe 1.3 register interface and command set.

In one or more aspects, when the portable secure storage device 110 is locked, the data transfer controller 260 is disengaged from the host 120. In one or more aspects, when the portable secure storage device 110 is plugged into the host 120, the portable secure storage device 110 is unrecognizable by the host 120 before the security access code inputted at the input device 296 is verified. The portable secure storage device 110 is removable from the host 120.

Table A below shows examples of physical interfaces (e.g., standard communication interfaces), protocols (e.g., standard communication protocols) and other related terms, including acronyms and descriptions.

TABLE A

| | |
|---|---|
| ATA | advanced technology attachment |
| eSATA | external serial advanced technology attachment |
| SATA | serial advanced technology attachment |
| eMMC | embedded multimedia controller |
| UFS | universal flash storage |
| AHCI | advanced host controller interface |
| IDE | integrated drive electronics |
| ENET | Ethernet |
| USB | universal serial bus |
| NVMe | non-volatile memory express |
| TCP/IP | transmission control protocol/internet protocol |
| HDD | hard disk drive |
| SCSI | small computer system interface |

Table B below shows examples of standard communication interfaces and associated standard communication protocols that are compatible with the standard communication interfaces.

TABLE B

| Standard Communication | Interfaces Standard Communication Protocols |
|---|---|
| USB | USB 2, USB 3.x, USB 4.x |
| FireWire (IEEE1394) | FireWire 400/800/1600/3200 |
| Thunderbolt 3 | Thunderbolt, Thunderbolt 2, Thunderbolt 3 |
| ENET 10/100/1000 | TCP/IP |
| eSATA, eSATA II, eSATA III | ATA, AHCI |

Table C below shows other examples of standard communication interfaces and associated standard communication protocols that are compatible with the standard communication interfaces.

TABLE C

| Standard Communication Interfaces | Standard Communication Protocols |
|---|---|
| PCIe | NVMe |
| SATA, SATA II, SATA III | ATA, AHCI |
| eMMC | parallel bus emulating HDD protocol |
| UFS | serial bus emulating SCSI architecture |

In one or more aspects, the standard communication interfaces 211 and 261 are of a first interface type (e.g., USB, FireWire (IEEE 1394), Thunderbolt 3, ENET 10/100/1000, eSATA, eSATA II, eSATA III) and compatible with standard communication protocols of a first protocol type (e.g., USB 2, USB 3.x, USB 4.x, FireWire 400/800/1600/3200, Thunderbolt, Thunderbolt 2, Thunderbolt 3, TCP/IP, ATA, AHCI). In one or more aspects, the standard memory interfaces 262 and 282 are of a second interface type (e.g., PCIe, SATA, SATA II, SATA III, eMMC, UFS) and compatible with standard memory interface protocols of a second protocol type (e.g., NVMe, ATA, AHCI, parallel bus emulating HDD protocol, serial bus emulating SCSI architecture). In one aspect, the first interface type is different from the second interface type. In one aspect, the first protocol type is different from the second protocol type. In another aspect, the first protocol type is the same as the second protocol type.

In one or more aspects, the side memory interface 283 is of an interface type that is different from the first interface type and the second interface type. The side data transfer interface 263 is of an interface type that is different from the first interface type and the second interface type. Similarly, in one aspect, the security interface 273 may be of an interface type that is different from the first interface type and the second interface type. Each of the side memory interface 283, the side data transfer interface 263, and the security interface 273 may include one or more interfaces, such as a SPIbus, a UART interface, an I2C interface, a GPIO interface, or a combination thereof. The security interface 273 is compatible with the side memory interface 283. The security interface 273 is compatible with the side data transfer interface 263.

Various examples of implementations and aspects of the disclosure are described further below.

In one or more implementations, during a primary mode, before the operational mode, and/or before the verification of the security access code inputted at the input device 296, the security controller 270 is configured to cause (a) storing the transformation key in the non-volatile memory 276 of the security controller 270 and (b) providing the transformation key to the memory controller 280 via the security interface 273. During the primary mode, before the operational mode, and/or before the verification of the security access code inputted at the input device 296, the memory controller 280 is configured to cause storing the transformation key (from the security controller 270) into the non-volatile memory 286.

In one or more implementations, during a primary mode, before the operational mode, and/or before the verification of the security access code inputted at the input device 296, the memory controller 280 is configured to receive the transformation key from the security controller 270 via the side memory interface 283. After the verification of the security access code inputted at the input device 296 during the operational mode, the memory controller 280 is configured to receive, from the security controller 270 via the side memory interface 283, the indication that the inputted security access code is verified. After the verification of the security access code inputted at the input device 296, the memory controller 280 is configured to receive, from the security controller 270 via the side memory interface 283, the concealed encryption key. In one or more aspects, the memory controller 280 may provide status information to the security controller 270 via the side memory interface 283. The data transfer controller 260 may provide status information (e.g., completion of enumeration or disengagement with the host) to the security controller 270 via the side data transfer interface 263.

In one or more aspects, a side communication channel 235 is one directional from the side data transfer interface 263 to the security interface 273 (e.g., providing the status information to the security controller 270). A side communication channel 237 may be bi-directional between the side memory interface 283 and the security interface 273 (e.g., providing the encryption keys and access code verification to the memory controller 280 and providing the status information to the security controller 270). The side memory interface 283 (e.g., including a GPIO) may provide a read/write activity LED signal to the security controller 270 to indicate that the portable secure storage device 110 is unlocked and a read/write operation is ongoing. In the foregoing two paragraphs, the security interface 273 may be utilized, in connection with a respective side interface (e.g., 263 or 283), to communicate with the security controller 270.

In one or more implementations, during a primary mode, before the operational mode, and/or before the verification of the security access code, the memory controller 280 is configured to receive the transformation key from the security controller 270. This may occur via the security interface 273, the side data transfer interface 263 and the data transfer controller 260 (e.g., via the standard memory interfaces 262 and 282). After the verification of the security access code inputted at the input device 296 during the operational mode, the memory controller 280 is configured to receive, from the security controller 270, the indication that the inputted security access code is verified. This may occur via the security interface 273, the side data transfer interface 263 and the data transfer controller 260 (e.g., via the standard memory interfaces 262 and 282). After the verification of the security access code inputted at the input device 296 during the operational mode, the memory controller 280 is configured to receive the concealed encryption key from the security controller 270 via the security interface 273, the side data transfer interface 263 and the data transfer controller 260 (e.g., via the standard memory interfaces 262 and 282). When the portable secure storage device 110 is caused to be locked, the data transfer controller 260 is configured to delete the transformation key and the concealed encryption key in the data transfer controller 260 (e.g., in the volatile memory 267).

In one or more aspects, the memory controller 280 may provide status information to the security controller 270 via the side memory interface 283. The data transfer controller 260 may provide status information (e.g., completion of enumeration or disengagement with the host) to the security controller 270 via the side data transfer interface 263.

In one or more aspects, a side communication channel 235 is bi-directional between the side data transfer interface 263 and the security interface 273 (e.g., providing the encryption keys and access code verification to the data transfer controller 260 and providing the status information to the security controller 270). In one or more aspects, a side communication channel 237 is one directional from the side memory interface 283 to the security interface 273 (e.g., providing the status information to the security controller 270). In the foregoing three paragraphs, the security interface 273 may be utilized, in connection with a respective side interface (e.g., 263 or 283), to communicate with the security controller 270.

In an alternative implementation, a portable secure storage device includes only one side interface. For example, a portable secure storage device includes a side data transfer interface 263 to communicate with a security interface 273. In this example, the portable secure storage device does not include a side memory interface 283. In this example, encryption keys, access code verification, and other information may be provided via the side data transfer interface 263 from the security controller 270 to the data transfer controller 260, which may provide some or all of the foregoing information to the memory controller 280. In this example, status and other information of the controllers 260 and 280 may be provided via the side data transfer interface 263 from the data transfer controller 260 to the security controller 270.

In another example, a portable secure storage device includes a side memory interface 283 to communicate with a security interface 273 but does not include a side data transfer interface 263. In this example, encryption keys, access code verification, and other information may be provided via the side memory interface 283 from the security controller 270 to the memory controller 280. The memory controller 280 may provide some of the foregoing information to the data transfer controller 260. In this example, status and other information of the controllers 260 and 280 may be provided via the side memory interface 283 from the memory controller 280 to the security controller 270. These are examples, and other side interface implementations and methods are within the scope of the subject technology.

In one or more implementation, after extracting the operating encryption key for encrypting or decrypting data during an operational mode, the memory controller 280 is configured to cause notifying the data transfer controller 260, via the standard memory interfaces 282 and 262, that the portable secure storage device 110 is to be unlocked.

In one or more implementation, after receiving a notification, from the memory controller 280 via the standard memory interfaces 282 and 262, that the portable secure storage device 110 is to be unlocked, the data transfer controller 260 is configured to initiate transmitting the enumeration information of the portable secure storage device 110 to the host 120. Before the portable secure storage device 110 is unlocked, the portable secure storage device 110 is unrecognizable by the host 120 even when the portable secure storage device 110 is plugged into the host 120. After the enumeration process with the host 120 is completed, the data transfer controller 260 is configured to notify the completion of the enumeration process to the security controller 270 via the side data transfer interface 263 (e.g., a GPIO pin).

In one or more implementation, the portable secure storage device 110 is configured to lock when one or more of the following events occur:
(a) an input device 296 receives a request to lock the portable secure storage device 110;
(b) a count of unsuccessful security access codes entered into the input device 296 exceeds a threshold number;
(c) power from the host 120 to the portable secure storage device 110 is interrupted;
(d) the portable secure storage device 110 is unplugged from the host 120;
(e) the portable secure storage device 110 is electrically disengaged from the host 120 in response to a request;
(f) the portable secure storage device 110 idles for a period of time; or
(g) the portable secure storage device 110 is not plugged into the host 120 within a period of time after the inputted security access code is verified.

In some aspects, a security controller 270 may determine whether an event to lock the portable secure storage device 110 has occurred. For example, the security controller 270 may determine whether to lock the device based on the above events (a) and (b). A data transfer controller 260 may notify the security controller 270 regarding the event (c), (d), (e) or (g). A data transfer controller 260 and/or a memory controller 280 may notify the security controller 270 regarding the event (c) or (f). When the security controller 270 determines that an event to lock the device has occurred, the security controller 270 may notify a memory controller 280 and/or a data transfer controller 260 so that the memory controller 280 and/or the data transfer controller 260 may perform the required operations (e.g., deleting all encryption keys in volatile memories) prior to the portable secure storage device 110 becomes locked.

Figure 4:
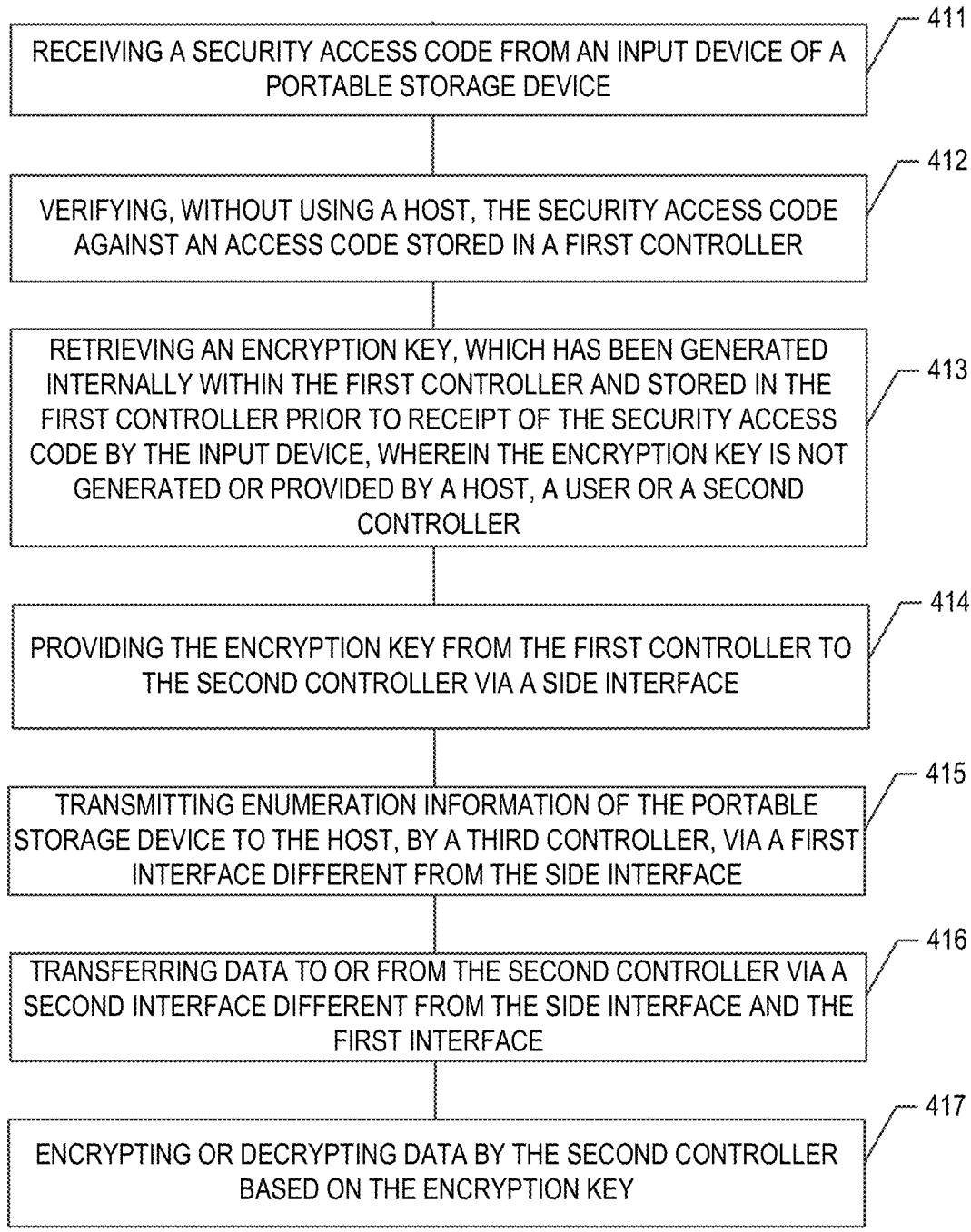
FIG. 4 illustrates an example of operations performed by a portable storage device.
Figure 5:
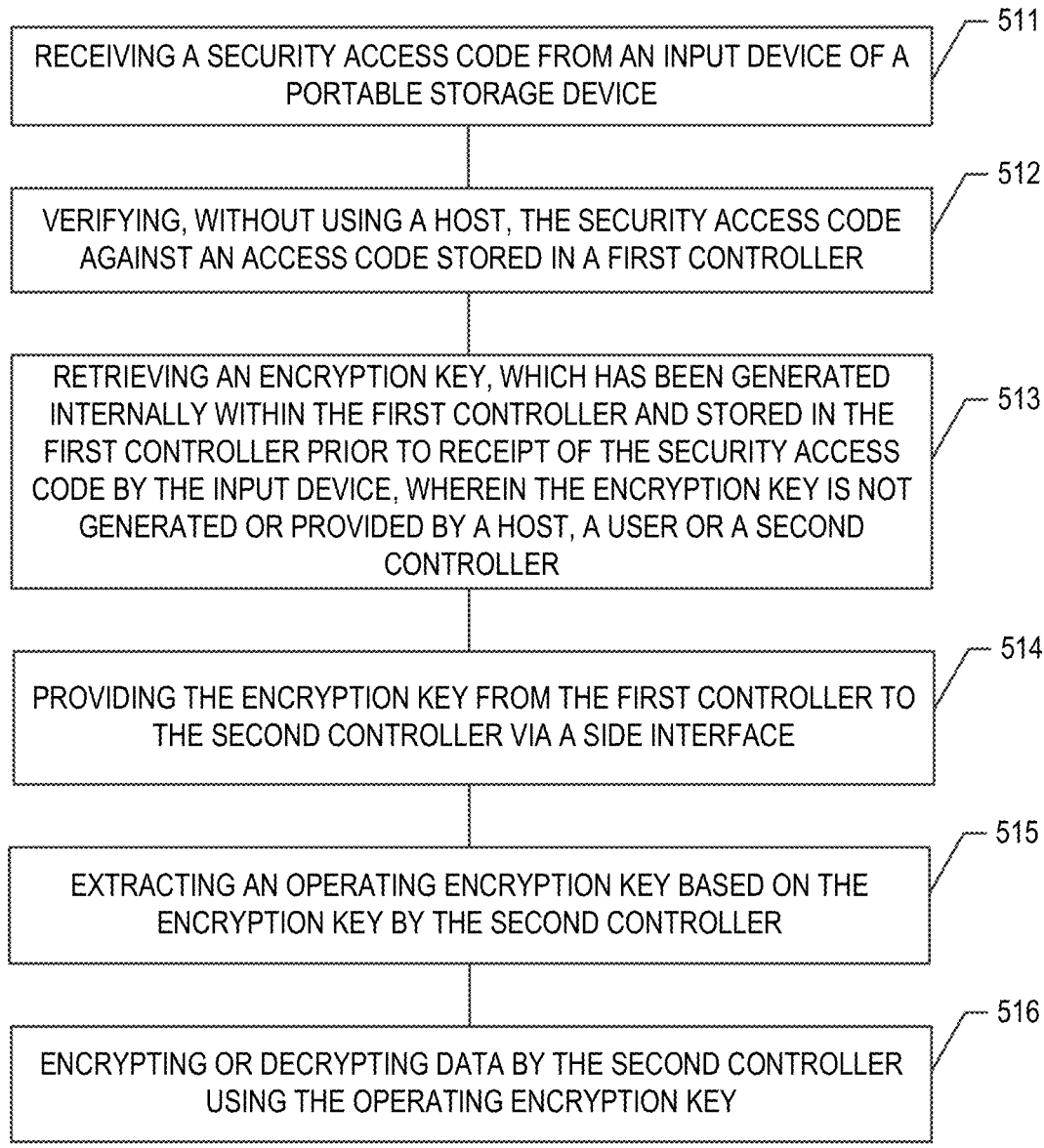
FIG. 5 illustrates another example of operations performed by a portable storage device.

During an operational mode, after the portable secure storage device 110 is locked, the portable secure storage device 110 may become unlocked for a normal operation (e.g., encrypting/decrypting data for writing/reading) when a security access code received at an input device 296 matches with a valid access code stored (see, e.g., block 314 in FIG. 3A, blocks 411 and 412 in FIG. 4, blocks 511 and 512 in FIG. 5). In some aspects, the operations relating to the blocks following the aforementioned blocks may then be performed (see, e.g., block 315 in FIG. 3A, blocks 321 through 325 in FIG. 3B, blocks 331 through 337 in FIG. 3C, blocks 413 through 417 in FIG. 4, and blocks 513 through 516 in FIG. 5).

In one or more implementation, when the portable secure storage device 110 is locked, the concealed encryption key is retained only in the non-volatile memory 276 of the security controller 270, and the concealed encryption key is not retained in the data transfer controller 260 or the memory controller 280. In one or more implementation, when the portable secure storage device 110 is locked, the transformation key is retained only in one or both of the non-volatile memory 276 of the security controller 270 and the non-volatile memory 286 of the memory controller 280. In one or more implementation, when the portable secure storage device 110 is caused to be locked, the operating encryption key is deleted from the portable secure storage device 110 and is not retained in the portable secure storage device 110 (e.g., not retained in any of the controllers 260, 270 and 280, any of their local memories 267, 276, 277, 286, 287) or the memory 289). In one aspect, the operating encryption key is not provided to or retained by the host 120.

In one or more implementations, when an encryption key (e.g., an encryption key, a concealed encryption key, a transformation key, an operating encryption key) is stored in the portable secure storage device 110 (e.g., a non-volatile memory, a volatile memory), the encryption key may be stored in various forms (e.g., a hash value, an encrypted value, a representation, or an exact copy thereof). In one or more implementations, when an access code is stored in the portable secure storage device 110 (e.g., a non-volatile memory, a volatile memory), the access code may be stored in various forms (e.g., a hash value, an encrypted value, a representation, or an exact copy thereof).

In one or more implementation, when the portable secure storage device 110 is locked, none of the concealed encryption key, the transformation key or the operating encryption key is generated by, provided from or provided to the host 120. When the portable secure storage device 110 is unlocked (or after the inputted security access code is verified and when the portable secure storage device 110 is unlocked), none of the concealed encryption key, the transformation key or the operating encryption key is generated by, provided from or provided to the host 120. When the portable secure storage device 110 is locked, none of the concealed encryption key, the transformation key or the operating encryption key is generated by, provided from or provided to a user. When the portable secure storage device 110 is unlocked (or after the inputted security access code is verified and when the portable secure storage device 110 is unlocked), none of the concealed encryption key, the transformation key or the operating encryption key is generated by, provided from or provided to the user. In one aspect, the foregoing in this paragraph refers to actions or inactions during an operational mode. In one aspect, some of the foregoing in this paragraph refers to actions or inactions during a primary mode.

In one or more implementations, after the verification of the security access code inputted at the input device 296, but before the memory controller 280 completes extracting the operating encryption key, one of the security controller 270 or the memory controller 280 may send a command to the data transfer controller 260. This may allow the data transfer controller 260 to initiate transmitting the enumeration information to the host 120. In this implementation, the enumeration process by the data transfer controller 260 and the operating encryption key extraction process by the memory controller 280 may be performed concurrently.

In an alternative implementation, the security controller 270 may generate one encryption key rather than multiple encryption keys during a primary mode, before the operational mode, and/or before the verification of the security access code inputted. This new encryption key is not generated or provided by a host, a user, or any other controllers in the portable secure storage device 110. The security controller 270 may retain the one encryption key in a non-volatile memory 276 and provide the encryption key to the memory controller 280 (e.g., via a side memory interface 283) after the inputted security access code is verified. The memory controller 280 may temporarily store the encryption key in a volatile memory 287. In another aspect, the encryption key may be sent via a side data transfer interface 263 and then from the data transfer controller 260 to the memory controller 280. When the portable secure storage device 110 is locked, the encryption key in a non-volatile memory is retained, but the encryption key in a volatile memory is deleted. The subject technology is not limited to the methods and implementations described herein regarding the generation and management of the encryption key(s). Other methods and implementations are within the scope of the subject technology.

FIG. 4 illustrates an example of operations performed by a portable storage device. The operations shown in FIG. 4 are for illustration purposes, and other operations are within the scope of the disclosure.

A portable storage device (e.g., 110) may receive a security access code at an input device (e.g., 296) to facilitate unlocking of the portable storage device (see, e.g., block 411 of FIG. 4). A first controller (e.g., 270) may verify the security access code against an access code stored in the first controller (see, e.g., block 412 of FIG. 4). When the security access code is verified, the first controller may retrieve an encryption key, which has been generated internally within the first controller and stored in the first controller prior to receipt of the security access code by the input device. In one aspect, only when the security access code is verified, the first controller may retrieve an encryption key, which has been generated internally within the first controller and stored in the first controller prior to receipt of the security access code by the input device. The encryption key is not generated or provided by a host (e.g., 120), a user or a second controller (e.g., 280) (see, e.g., block 413 of FIG. 4). The first controller may provide the encryption key to the second controller (see, e.g., block 414 of FIG. 4). When the portable storage device is locked, the first controller is configured to cause retaining the encryption key only in the first controller.

After the security access code is verified, the second controller (e.g., 280) may be configured to cause receiving the encryption key from the first controller, via a side interface coupled to the first controller (see, e.g., block 414 of FIG. 4). In one aspect, only after the security access code is verified, the second controller (e.g., 280) may be configured to cause receiving the encryption key from the first controller, via a side interface coupled to the first controller (see, e.g., block 414 of FIG. 4).

After the security access code is verified, the third controller (e.g., 260) may be configured to cause: (a) transmitting enumeration information of the portable storage device to the host via a first interface of the third controller (see, e.g., block 415 of FIG. 4); and (b) transferring data from the host to the second controller, via a second interface of the third controller, for encryption and storage (see, e.g., block

416 of FIG. 4). In one aspect, only after the security access code is verified, the third controller (e.g., 260) may be configured to cause: (a) transmitting enumeration information of the portable storage device to the host via a first interface of the third controller (see, e.g., block 415 of FIG. 4); and (b) transferring data from the host to the second controller, via a second interface of the third controller, for encryption and storage (see, e.g., block 416 of FIG. 4).

After the security access code is verified, the second controller may be configured to cause: (a) encrypting, data from the host, based on the encryption key, and providing the encrypted data to the memory; and (b) decrypting, data from the memory, based on the encryption key, and providing the decrypted data to a third controller (e.g., 260) (see, e.g., block 417 of FIG. 4). In one aspect, only after the security access code is verified, the second controller may be configured to cause: (a) encrypting, data from the host, based on the encryption key, and providing the encrypted data to the memory; and (b) decrypting, data from the memory, based on the encryption key, and providing the decrypted data to a third controller (e.g., 260) (see, e.g., block 417 of FIG. 4). When the portable storage device is caused to be locked, the second controller is configured to cause deleting the encryption key from the second controller.

In one or more aspects, the first interface is of a first type, the second interface is of a second type, and the side interface is of a third type. The first type is different from the second type. The third type is different from the first type and the second type. When the portable storage device is plugged into the host, the portable storage device is unrecognizable by the host before the security access code is verified. The portable storage device is separate and distinct from the host. The first controller is separate and distinct from the second controller. When the portable storage device is locked, the third controller is disengaged from the host.

FIG. 5 illustrates another example of operations performed by a portable storage device. The operations shown in FIG. 5 are for illustration purposes, and other operations are within the scope of the disclosure.

A portable storage device (e.g., 110) may receive a security access code at an input device (e.g., 296) to facilitate unlocking of the portable storage device (see, e.g., block 511 of FIG. 5). A first controller (e.g., 270) may verify the security access code against an access code stored in the first controller (see, e.g., block 512 of FIG. 5). When the security access code is verified, the first controller may retrieve an encryption key, which has been generated internally within the first controller and stored in the first controller prior to receipt of the security access code by the input device. In one aspect, only when the security access code is verified, the first controller may retrieve an encryption key, which has been generated internally within the first controller and stored in the first controller prior to receipt of the security access code by the input device. The encryption key is not generated or provided by a host (e.g., 120), a user or a second controller (see, e.g., block 513 of FIG. 5). The first controller may provide the encryption key to the second controller (see, e.g., block 514 of FIG. 5). When the portable storage device is locked, the first controller is configured to cause retaining the encryption key only in the first controller.

After the security access code is verified, the second controller may be configured to cause (a) receiving the encryption key from the first controller, via the side interface (e.g., 283) coupled to the first controller (see, e.g., block 514 of FIG. 5) and (b) extracting an operating encryption key based on the encryption key (see, e.g., block 515 of FIG. 5).

In one aspect, only after the security access code is verified, the second controller may be configured to cause (a) receiving the encryption key from the first controller, via the side interface (e.g., 283) coupled to the first controller (see, e.g., block 514 of FIG. 5) and (b) extracting an operating encryption key based on the encryption key (see, e.g., block 515 of FIG. 5). In one implementation, the second controller may include some or all of the functionality of two controllers 280 and 260.

After the security access code is verified, the second controller may be configured to cause: (a) encrypting, data from the host, based on the operating encryption key and providing the encrypted data to the memory; and (b) decrypting, data from the memory, based on the operating encryption key and providing the decrypted data toward the host (see, e.g., block 516 of FIG. 5). In one aspect, only after the security access code is verified, the second controller may be configured to cause: (a) encrypting, data from the host, based on the operating encryption key and providing the encrypted data to the memory; and (b) decrypting, data from the memory, based on the operating encryption key and providing the decrypted data toward the host (see, e.g., block 516 of FIG. 5). When the portable storage device is caused to be locked, the second controller is configured to cause deleting the encryption key and the operating encryption key from the second controller.

After the security access code is verified, the portable storage device may be configured to cause: (a) transmitting enumeration information of the portable storage device to the host via a first interface of the portable storage device; and (b) receiving the data from the host for encryption and storage. In one aspect, only after the security access code is verified, the portable storage device may be configured to cause: (a) transmitting enumeration information of the portable storage device to the host via a first interface of the portable storage device; and (b) receiving the data from the host for encryption and storage.

In one or more aspects, the first interface is of a first type, the side interface is of a second type, and the first type is different from the second type. The portable storage device is separate and distinct from the host. The portable storage device is removable from the host. The first controller is separate and distinct from the second controller.

Various additional examples of implementations and aspects of the disclosure are described further below.

In one or more implementations (including some implementations of FIG. 5), a portable storage device may include a data controller, a memory 289, a security controller 270, an input device 296, and an output device 294. The data controller may include (a) all of the functionality of a memory controller 280 as well as all of the functionality of a data transfer controller 260 or, alternatively, (b) some of such functionalities. Thus, the aforementioned data controller may replace two controllers 280 and 260. In this example, the data controller may include a standard communication interface 261, a side memory interface 283, and an encryption/decryption engine 284. The encryption decryption engine 284 may include a transformation engine 285, a non-volatile memory 286 and a volatile memory 287. In this example, the standard communication interface 261 included in the data controller may interface with a host 120 via the standard communication interface 211. In this example, the security controller 270 may include a security interface 273, a transformation engine 275, a non-volatile memory 276, a volatile memory 277 and a tamper detection circuit 278. In this example, the portable storage device and its functions are similar to the portable secure storage device shown in FIG. 2 and its functions; however, the data controller may contain all or only some of the functionalities of the memory controller 280 and the data transfer controller 260. In one aspect, the second controller described with reference to FIG. 5 may represent a data controller described in this paragraph. In this example, the descriptions provided herein (e.g., with respect to FIGS. 1 through 5) or portions thereof may be applicable, except for the differences noted above in this paragraph.

In one or more implementations, a data transfer controller (similar to the controller 260) of a portable storage device may be incorporated into a memory module 290 so that the memory module 290 includes a data transfer controller (similar to the controller 260), a memory controller 280 and a memory 289. In this example, the descriptions provided herein (e.g., with respect to FIGS. 1 through 5) or portions thereof may be applicable, except for the differences noted above in this paragraph.

In one or more implementations, a data transfer controller (similar to the controller 260) of a portable storage device, instead of a memory controller 280, may include an encryption/decryption engine 284. In this example, the encryption/decryption engine 284 includes a transformation engine 285, a non-volatile memory 286, and a volatile memory 287. In this example, a side memory interface 283 may be eliminated, in which case a side data transfer interface 263 may be used to exchange the encryption keys, access code verification indication and status information between a security controller 270 and the data transfer controller of this example. In an alternative implementation, in addition to a side data transfer interface 263, a side memory interface 283 may be utilized to exchange information (e.g., status information) between a memory controller 280 and the security controller 270. In this example, the descriptions provided herein (e.g., with respect to FIGS. 1 through 5) or portions thereof may be applicable, except for the differences noted above. In this example, the security controller 270 may generate the encryption keys (e.g., a concealed encryption key, a transformation key and an operational encryption key) as described herein. The security controller 270 may provide, to the data transfer controller of this example, (a) a transformation key during a first time period and (b) a concealed encryption key during a second time period.

In one or more implementations, a portable secure storage device 110 may be plugged into a host 120 by a user via a USB port at various times. For example, a portable secure storage device 110 may be plugged into a host 120 prior to any of the operations shown in FIGS. 3A, 3B, 3C, 4 and 5. However, merely plugging in the device 100 to the host 120 does not allow the device 100 to be recognized by the host 120. Even though the device 110 does not require any special software or special driver on the host 120, the device 110 needs to perform certain operations by itself prior to the device 110 becomes recognizable by the host 120. This improves security of the device 110. The portable secure storage device 110 is not recognizable or detectable by the host 120 until after a security access code (e.g., received at an input device 296) is verified by a security controller 270. In one aspect, the device 110 is not recognizable or detectable by the host 120 until after an enumeration process between the device 110 and the host 120 is initiated. In one aspect, the device 110 is not recognizable or detectable by the host 120 until after an enumeration process between the device 110 and the host 120 is completed. In one aspect, the device 110 is not recognizable or detectable by the host 120 until after an operating encryption key is extracted in the device 110. When the device 110 is unlocked (e.g., as a result of, in response to or after one or more operations described in this paragraph), the device is recognizable by the host 120.

Referring to FIG. 2, in one aspect, a memory module 290 is on a printed circuit board, a memory controller 280 is a packaged IC chip, and a memory 289 is one or more packaged IC chips. In one aspect, a data transfer controller 260 is a packaged IC chip, and a security controller 270 is a packaged IC chip. In one aspect, the security controller 270 is physically separate and apart from the memory controller 280 and the data transfer controller 260.

In one aspect, the memory controller 280 directly controls the memory 289, and the data transfer controller 260 and the security controller 270 do not directly control the memory 289. In one aspect, user data from a host 120 follows a path from the host 120, to the data transfer controller 260, to the memory controller 280, and then to the memory 289. The memory controller 280 encrypts the user data before passing it to the memory 289. In this regard, the security controller 270 does not receive the user data from the host 120 (to be stored in the memory 289) and does not encrypt or decrypt such user data.

In another aspect, user data in the memory 289 follows a path from the memory 289 to the memory controller 280, to the data transfer controller 260, and then to the host 120. When the user data in the memory 289 is encrypted, the memory controller 280 may decrypt the user data before passing it to the data transfer controller 260. In this regard, the security controller 270 does not receive the user data being sent from the memory 289 (directed to the host 120) and does not decrypt or encrypt such user data.

In one or more aspects, a controller (e.g., 280) or a module (e.g., 290), which encrypts or decrypts user data (destined to the host 120 or destined to the memory 289), does not generate any new encryption keys. A separate controller (e.g., 270) generates new encryption key(s).

In one or more aspects, a controller (e.g., 280) or a module (e.g., 290), which performs data compression or decompression and/or error correction encoding or decoding of user data (destined to the host 120 or destined to the memory 289), does not generate any new encryption keys. A separate controller (e.g., 270) generates new encryption key(s) and does not perform data compression or decompression or error correction encoding or decoding of user data.

In one or more aspects, a controller (e.g., 260), which directly communicates with the host 120 and performs an enumeration process, does not generate any new encryption keys. A separate controller (e.g., 270) generates new encryption key(s) and does not directly communicates with the host 120 and does not directly perform an enumeration process with the host.

In one aspect, a controller (e.g., 260, 280) and a module (e.g., 290)—which are not the security controller 270—do not receive a security access code inputted at an input device 296 and do not receive any access code stored in the security controller 270 or its associated memory (e.g., 276 or 277). In one aspect, access codes are retained and verified only in the security controller 270.

In one aspect the controller 260 and 280 are prevented from generating new encryption keys and prevented from receiving access codes. In one aspect, the security controller 270 is prevented from receiving and prevented from performing operations on user data.

In one aspect, user data does not control any operation of a portable secure storage device 110. In one aspect, user data does not instruct any of the controllers (e.g., 260, 270, 280) of the portable secure storage device to perform a function.

In one aspect, user data does not include any access codes, configuration parameters, or encryption keys of the portable secure storage device. In one aspect, user data does not include any data inputted at an input device (e.g., 296) of the portable secure storage device 110. In one aspect, user data is received from a host 120. In one aspect, user data is transferred to a memory 289 and retained in the memory 289 when power is off. In one aspect, user data is not retained in the security controller 270.

One or more aspects of the subject technology may provide various advantages, including without limitation the example advantages described below.

In an advantageous aspect, a security controller 270 is located within a portable secure storage device 110 but is separate and distinct from a memory controller 290 that encrypts and decrypts user data. The security controller 270 is also separate and distinct from a data transfer controller 260 that converts and transfers user data. During a primary mode, before the operational mode, and/or before the verification of the security access code inputted, the security controller 270 can by itself generate new encryption key(s) (e.g., a concealed encryption key, a transformation key and an operating encryption key) without using the host 120. The new encryption key(s) are not generated or provided by the host 120, a user, the memory controller 290, or other components (e.g., 260) of the portable secure storage device 110.

Furthermore, the security controller 270 has the highest security level among the controllers and components (e.g., 260 and 280) of the portable secure storage device. The security controller 270 is physically and electronically more secure. In addition, while the data transfer controller 260 and the memory controller 280 are in the direct path between the host 120 and the memory 289 for transferring and processing commands and data received from outside (e.g., the host 120), the security controller 270 is not in this path. The security controller 270 is protected and may avoid receiving outside commands and data, which may impose security risks. Accordingly, new encryption key(s) can be generated in a highly secure manner.

In an advantageous aspect, a concealed encryption key is retained only by the security controller 270's non-volatile memory. A transformation key is retained only by the security controller 270's non-volatile memory and the memory controller 280's non-volatile memory. The security controller 270's volatile memory temporarily stores an operating encryption key. The memory controller 280's volatile memory temporarily stores an operating encryption key and a concealed encryption key. Hence, the concealed encryption key (which requires the highest security level among the keys) is only retained in the security controller 270 until new encryption key(s) are generated. In one aspect, no encryption keys are provided to the host 120. When the portable secure storage device 110 is locked, only the encryption key(s) in the non-volatile memories are retained, and any encryption key(s) in a volatile memory is deleted.

Furthermore, during an operational mode, the memory controller 280 and the security controller 270 can exchange encrypted messages as each controller can extract an operating encryption key based on a transformation key and a concealed encryption key using a transformation engine and decrypt the encrypted message. For example, when the memory controller 280 sends an encrypted message to the security controller 270, the security controller 270 (e.g., a transformation engine 275) can extract an operating encryption key based on a transformation key and a concealed encryption key retained in the non-volatile memory 276. The security controller 270 can then decrypt the encrypted message. In one aspect, a transformation key is provided to the memory controller during one time period (e.g., during a primary mode). A concealed encryption key is provided to the memory controller 280 during a different time period (e.g., during an operational mode). The techniques used to generate, store and transfer the encryption(s) as described herein greatly improve security of the portable secure storage device 110.

In an advantageous aspect, the operations relating to blocks 311, 312 and 313 of FIG. 3A are performed by the security controller 270 during a primary mode, before the operational mode, and/or before the verification of the security access code inputted. In this regard, the operations relating to blocks 314 and 315 of FIG. 3A are performed by the security controller 270 during an operational mode. Performing these operations in two separate modes in different time periods improve security of the portable secure storage device 110.

In an advantageous aspect, the operations relating to block 321 of FIG. 3B is performed or initiated by the data transfer controller 260 after the operations relating to block 331, 332, 333, and/or 334 of FIG. 3C are performed, initiated or completed by the memory controller 280. When the operations relating to block 321 is initiated after the operating encryption key is extracted and/or stored (e.g., block 333 and/or 334), this ensures that the portable secure storage device 110 is accessible by the host 120 only after the inputted access code is verified and only after the operating encryption key is available for encrypting and decrypting data. This ensures that all data from the host 120 can be encrypted and stored securely in the memory 289 and that the encrypted data in the memory 289 can be properly decrypted and provided to the host 120. In this example, the security controller 270 may send, to the memory controller 280 via the side memory interface 283, an indication that the inputted security access code is verified, and the memory controller 280 may send, to the data transfer controller 260 via the interfaces 282 and 262, to initiate the operations relating to block 321.

In another advantageous aspect, the operations relating to block 321 of FIG. 3B is performed or initiated before performing or initiating the operations relating to block 331, 332, 333, and/or 334 of FIG. 3C. This allows the operations relating to block 321 to be performed concurrently with or prior to the operations relating to block 331, 332, 333 and/or 334. This is advantageous as it can increase the speed of operation of the portable secure storage device 110. In one example, the security controller 270 may send, to the memory controller 280 via the side memory interface 283 and to the data transfer controller 260 via the side data transfer interface 263, an indication that the inputted security access code is verified. In another example, the indication may be sent from the security controller 270 to the memory controller 280 and then to the data transfer controller 260. In yet another example, the indication may be sent from the security controller 270 to the data transfer controller 260 and then to the memory controller 280.

Utilizing standard interfaces (e.g., 261, 262, 283) allows a data transfer controller 260 and a memory controller 280 to be scalable and to be replaceable by another data transfer controller and another a memory controller, respectively, that have compatible standard interfaces and that can provide higher bandwidth, speed and/or storage capacity. In addition, using a side memory interface 283 directly with a security interface 273 improves security of the portable secure storage device 110. In an advantageous aspect, a side interface (e.g., 283, 263) and its side channel (e.g., 237, 235) are less vulnerable to security attacks than the widely used standard interfaces (e.g., 282, 262, 261) and their communication channels (e.g., 230, 130). Furthermore, in one aspect, while the standard communication interfaces and the standard memory interfaces (and their channels) are used extensively during an operational mode, a side interface and its channel are used only for certain commands, keys, parameters and status information (not user data) and only for certain short time periods. In one example, the short time period may be between 0.001% and 30% of an operational mode. In another example, the short time period may be between 0.001% and 20% of an operational mode. In another example, the short time period may be between 0.001% and 10% of an operational mode. In another example, the short time period may be between 0.001% and 5% of an operational mode. In another example, the short time period may be between 0.001% and 1% of an operational mode.

In one or more aspects, the subject technology may be carried out by one or more of the following.

A method comprising one or more methods or operations described herein.

An apparatus or a portable storage device comprising one or more memories or registers (e.g., 267, 276, 277, 286, 287) and one or more processors (e.g., 260, 270, 280) coupled to the one or more memories, the one or more processors configured to cause the apparatus to perform one or more methods or operations described herein.

A hardware apparatus comprising circuits (e.g., 260, 270, 280) configured to perform one or more methods, operations, or portions thereof described herein.

An apparatus or a portable storage device comprising means (e.g., 260, 270, 280) adapted for performing one or more methods or operations described herein.

A computer-readable storage medium (e.g., 267, 276, 277, 286, 287, one or more memories, one or more registers, and/or one or more media) comprising instructions stored therein, the instructions comprising code for performing one or more methods or operations described herein.

A computer-readable storage medium (e.g., 267, 276, 277, 286, 287, one or more memories, one or more registers, and/or one or more media) storing instructions that, when executed by one or more processors (e.g., 260, 270, 280), cause one or more processors to perform one or more methods, operations or portions thereof described herein.

An apparatus or a portable storage device comprising means (e.g., 260, 270, 280) for performing one or more operations of one or more blocks in FIGS. 3A, 3B and 3C or one or more operations described herein.

An apparatus or a portable storage device comprising means (e.g., 260, 270, 280) for performing one or more operations of one or more blocks in FIG. 4 or one or more operations described herein.

An apparatus or a portable storage device comprising means (e.g., 260, 270, 280) for performing one or more operations of one or more blocks in FIG. 5 or one or more operations described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more sentences, one or more phrases, one or more paragraphs, and/or one or more claims. A clause or a claim may have multiple dependencies based on any of the other clauses or claims.

An example of the present disclosure may be an article of manufacture in which a non-transitory machine-readable medium (such as microelectronic memory, e.g., 267, 276, 277, 286, 287, 289) has stored thereon instructions which program one or more data processing components (e.g., 260, 270, 280) to perform one or more operations described herein. In other examples, some of these operations may be performed by specific hardware components that contain hardwired logic. Those operations may alternatively be performed by any combination of programmed data processing components and fixed hardwired circuit components.

In some cases, an example of the present disclosure may be an apparatus (e.g., a secure flash storage device) that includes one or more hardware and firmware/software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

The term "machine-readable storage medium," "computer readable medium" or "medium" may refer to any medium or media that participate in providing instructions to a processor or controller for execution. Such a medium may take many forms, including, but not limited to, non-volatile media and volatile media. Non-volatile media include, for example, optical or magnetic disks, such as a data storage unit. Volatile media include dynamic memory. Common forms of machine-readable media include, for example, a flexible disk, a hard disk, a magnetic medium, a CD-ROM, DVD, any other optical medium, a RAM, a PROM, an EEPROM, a FLASH EPROM or any other medium from which a computer can read. The machine-readable storage medium can be a machine-readable storage device, a machine-readable storage substrate, a memory device, or a combination of one or more of them.

To illustrate the interchangeability of hardware, firmware and software, items such as the various illustrative blocks, modules, components, methods, operations, instructions, and algorithms have been described generally in terms of their functionality. Whether such functionality is implemented as hardware, firmware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, contain or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions. The term coupling, connecting, or the like is intended to include direct and indirect coupling and direct and indirect connecting. The term coupled, connected, or the like is intended to include directly and indirectly coupled and directly and indirectly connected.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. Unless explicitly stated otherwise, these may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The entire content of U.S. patent application Ser. No. 15/286,465 is incorporated herein by reference.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A portable secure storage device, comprising:
   a casing;
   a memory disposed within the casing and configured to store encrypted data;
   an input device disposed at the casing and configured to receive a security access code inputted to facilitate unlocking of the portable secure storage device;
   an output device disposed at the casing and configured to provide an output;
   a security controller disposed within the casing and coupled to the input device, wherein the security controller comprises a non-volatile memory and a security interface, and wherein the security controller is configured to cause:
      prior to receipt of the security access code by the input device and prior to communicating with a host, generating, without using the host, a transformation key and a concealed encryption key internally within the security controller, wherein the transformation key is for transforming the concealed encryption key to an operating encryption key, wherein the host is separate and distinct from the portable secure storage device, and wherein the concealed encryption key and the transformation key are not generated or provided by the host, a user, a memory controller or a data transfer controller;
      storing the concealed encryption key in the non-volatile memory of the security controller;
      providing the transformation key via the security interface;
      receiving the security access code inputted at the input device of the portable secure storage device;
      determining, without using the host, whether the inputted security access code matches with an access code stored within the non-volatile memory of the security controller;

when the inputted security access code is verified against the stored access code, providing an indication that the inputted security access code is verified, fetching the concealed encryption key from the non-volatile memory of the security controller, and providing the concealed encryption key via the security interface; and when the portable secure storage device is locked, maintaining the concealed encryption key and the access code stored in the non-volatile memory of the security controller;

the memory controller disposed within the casing and coupled to the security controller, wherein the memory controller comprises a transformation engine, a non-volatile memory, a volatile memory, a first standard memory interface, and a side memory interface, and wherein the memory controller is configured to cause:

after the inputted security access code is verified:
receiving the concealed encryption key via the side memory interface or a side data transfer interface;
temporarily storing the concealed encryption key in the volatile memory of the memory controller;
extracting the operating encryption key, based on the concealed encryption key and the transformation key, using the transformation engine;
temporarily storing the extracted operating encryption key in the volatile memory of the memory controller;
communicating with the security controller via the side memory interface or the side data transfer interface;
receiving data from the data transfer controller via the first standard memory interface;
encrypting, the data received from the data transfer controller, using the operating encryption key, and providing the encrypted data to the memory; and
decrypting, data received from the memory, using the operating encryption key, and providing the decrypted data to the data transfer controller via the first standard memory interface; and when the portable secure storage device is caused to be locked, deleting the concealed encryption key and the operating encryption key temporarily stored in the volatile memory of the memory controller; and the data transfer controller disposed within the casing and coupled to the security controller and the memory controller, wherein the data transfer controller comprises a standard communication interface, a second standard memory interface, and the side data transfer interface, and wherein the data transfer controller is configured to cause:

after the inputted security access code is verified:
transmitting enumeration information of the portable secure storage device to the host via the standard communication interface of the data transfer controller;
after an enumeration process with the host is completed, notifying a completion of the enumeration process via the side data transfer interface;
receiving data compatible with a standard communication interface protocol from the host via the standard communication interface;
converting the data compatible with the standard communication interface protocol to data compatible with a standard memory interface protocol; and providing the data compatible with the standard memory interface protocol to the memory controller, via the second standard memory interface, for encryption and storage in the memory, wherein:
when the portable secure storage device is locked, the data transfer controller is disengaged from the host,
when the portable secure storage device is plugged into the host, the portable secure storage device is unrecognizable by the host before the inputted security access code is verified,
the portable secure storage device is removable from the host,
the security controller comprises a tamper detection circuit configured to detect security tampering of the security controller, and a security level of the security controller is higher than a security level of the memory controller and a security level of the data transfer controller,
the standard communication interface is of a first interface type, the first standard memory interface is of a second interface type, the second standard memory interface is of the second interface type, and the first interface type is different from the second interface type,
the side memory interface is of an interface type that is different from the first interface type and the second interface type, and
the side data transfer interface is of an interface type that is different from the first interface type and the second interface type.

2. The portable secure storage device of claim 1,
wherein before the security controller receives the security access code, the security controller is configured to generate a new operating encryption key and a new transformation key internally, without using the host, the memory controller or the data transfer controller and without receiving a command from the host to generate the new operating encryption key or the new transformation key,
wherein the security controller is further configured to generate a new concealed encryption key internally based on the new operating encryption key and the new transformation key using a transformation engine within the security controller, without using the host, the memory controller or the data transfer controller and without receiving a command from the host to generate the new concealed encryption key,
wherein none of the new operating encryption key, the new transformation key, and the new concealed encryption key is usable to decrypt any data stored in the memory prior to generation of the new operating encryption key, the new transformation key, and the new concealed encryption key, and
wherein the new operating encryption key represents the operating encryption key, the new transformation key represents the transformation key, and the new concealed encryption key represents the concealed encryption key.

3. The portable secure storage device of claim 1,
wherein before the security access code is verified, the security controller is configured to cause storing the transformation key in the non-volatile memory of the security controller and providing the transformation key to the memory controller via the security interface, and the memory controller is configured to cause storing the transformation key into the non-volatile memory of the memory controller, and wherein when the portable secure storage device is locked, the memory controller is configured to cause retaining the transformation key in the non-volatile memory of the memory controller.

4. The portable secure storage device of claim 1,
wherein before the inputted security access code is verified, the memory controller is configured to receive the transformation key from the security controller via the side memory interface,
wherein after the inputted security access code is verified, the memory controller is configured to receive, from the security controller via the side memory interface, the indication that the inputted security access code is verified, and
wherein after the inputted security access code is verified, the memory controller is configured to receive, from the security controller via the side memory interface, the concealed encryption key.

5. The portable secure storage device of claim 1,
wherein before the inputted security access code is verified, the memory controller is configured to receive the transformation key from the security controller via the side data transfer interface and the data transfer controller,
wherein after the inputted security access code is verified, the memory controller is configured to receive, from the security controller via the side data transfer interface and the data transfer controller, the indication that the inputted security access code is verified, and
wherein after the inputted security access code is verified, the memory controller is configured to receive the concealed encryption key from the security controller via the side data transfer interface and the data transfer controller.

6. The portable secure storage device of claim 5, wherein when the portable secure storage device is caused to be locked, the data transfer controller is configured to delete the transformation key and the concealed encryption key in the data transfer controller.

7. The portable secure storage device of claim 1, wherein after extracting the operating encryption key, the memory controller is configured to cause notifying the data transfer controller, via the first standard memory interface, that the portable secure storage device is to be unlocked.

8. The portable secure storage device of claim 7,
wherein after receiving a notification, from the memory controller via the second standard memory interface, that the portable secure storage device is to be unlocked, the data transfer controller is configured to initiate transmitting the enumeration information of the portable secure storage device to the host,
wherein before the portable secure storage device is unlocked, the portable secure storage device is unrecognizable by the host even when the portable secure storage device is plugged into the host, and
wherein after the enumeration process with the host is completed, the data transfer controller is configured to notify the completion of the enumeration process to the security controller via the side data transfer interface.

9. The portable secure storage device of claim 1, wherein the portable secure storage device is configured to lock when one or more of the following occur:
the input device receives a request to lock the portable secure storage device;
a count of unsuccessful security access codes entered into the input device exceeds a threshold number;
power from the host to the portable secure storage device is interrupted;
the portable secure storage device is unplugged from the host;
the portable secure storage device is electrically disengaged from the host in response to a request;
the portable secure storage device idles for a period of time; or
the portable secure storage device is not plugged into the host within a period of time after the inputted security access code is verified.

10. The portable secure storage device of claim 1, wherein when the portable secure storage device is locked, the concealed encryption key is retained only in the non-volatile memory of the security controller, and the concealed encryption key is not retained in the data transfer controller, the memory controller or the host.

11. The portable secure storage device of claim 10, wherein when the portable secure storage device is locked, the transformation key is retained only in one or both of the non-volatile memory of the security controller and the non-volatile memory of the memory controller.

12. The portable secure storage device of claim 11, wherein when the portable secure storage device is caused to be locked, the operating encryption key is deleted from the portable secure storage device and is not retained in the portable secure storage device.

13. The portable secure storage device of claim 1,
wherein when the portable secure storage device is locked, none of the concealed encryption key, the transformation key or the operating encryption key is generated by, provided from or provided to the host,
wherein after the inputted security access code is verified and when the portable secure storage device is unlocked, none of the concealed encryption key, the transformation key or the operating encryption key is generated by, provided from or provided to the host,
wherein when the portable secure storage device is locked, none of the concealed encryption key, the transformation key or the operating encryption key is generated by, provided from or provided to a user, and
wherein after the inputted security access code is verified and when the portable secure storage device is unlocked, none of the concealed encryption key, the transformation key or the operating encryption key is generated by, provided from or provided to the user.

14. The portable secure storage device of claim 1,
wherein the security controller is configured to generate the concealed encryption key and the transformation key in a primary mode,
wherein in the primary mode, the portable secure storage device does not contain a valid access code to be used to compare against the security access code inputted to facilitate unlocking the portable secure storage device after the portable secure storage device is locked,
wherein data stored in the memory prior to generating the concealed encryption key is not capable of being decrypted using the concealed encryption key, the transformation key or the operating encryption key,
wherein when the portable secure storage device is in the primary mode, the security controller permits a representation of the access code to be entered, and when the access code is accepted and stored as a new valid access code, the portable secure storage device is no longer in the primary mode, and the portable secure storage device is in an operational mode, wherein the primary mode is different from the operational mode, and wherein in the operational mode, the security controller is configured to cause receiving the security access code inputted at the input device, determining whether the inputted security access code matches with the access code, and the security controller is configured to, when the inputted security access code is verified, providing the indication and the concealed encryption key directly or indirectly to the memory controller.

15. The portable secure storage device of claim 1, wherein before the memory controller completes extracting the operating encryption key, one of the security controller or the memory controller is configured to cause the data transfer controller to initiate transmitting the enumeration information to the host.

16. The portable secure storage device of claim 1,
wherein the memory controller is configured to provide encrypted information to the security controller via the side memory interface or the side data transfer interface, and
wherein the security controller is configured to extract the operating encryption key based on the concealed encryption key and the transformation key and to decrypt the encrypted information using the operating encryption key.

17. A portable storage device, comprising:
a housing;
a memory disposed within the housing and configured to store encrypted data;
an input device disposed at the housing and configured to receive a security access code to facilitate unlocking of the portable storage device;
a first controller disposed within the housing and coupled to the input device, the first controller configured to cause:
  verifying, without using a host, the security access code received at the input device of the portable storage device, against an access code stored in the first controller;
  when the security access code is verified,
    retrieving an encryption key, which has been generated internally within the first controller and stored in the first controller prior to receipt of the security access code by the input device, wherein the encryption key is not generated or provided by the host, a user, a second controller or a third controller; and
    providing the encryption key; and
  when the portable storage device is locked, retaining the encryption key only in the first controller;
the second controller disposed within the housing and coupled to the first controller and the memory, the second controller configured to cause:
  after the security access code is verified:
    receiving the encryption key from the first controller, via a side interface coupled to the first controller;
    encrypting, data from the host, based on the encryption key, and providing the encrypted data to the memory; and
    decrypting, data from the memory, based on the encryption key, and
    providing the decrypted data to the third controller; and
  when the portable storage device is caused to be locked, deleting the encryption key from the second controller; and the third controller disposed within the housing and coupled to the first controller and the second controller, the third controller configured to cause:
  after the security access code is verified:
    transmitting enumeration information of the portable storage device to the host via a first interface of the third controller; and
    transferring the data from the host to the second controller, via a second interface of the third controller, for encryption and storage,
wherein:
the first interface is of a first type,
the second interface is of a second type,
the side interface is of a third type,
the first type is different from the second type,
the third type is different from the first type and the second type,
when the portable storage device is plugged into the host, the portable storage device is unrecognizable by the host before the security access code is verified,
the portable storage device is separate and distinct from the host,
the first controller is separate and distinct from the second controller, and
when the portable storage device is locked, the third controller is disengaged from the host.

18. The portable storage device of claim 17,
wherein the second controller comprises the side interface, and
wherein the second controller is configured to cause:
  extracting an operating encryption key based on the encryption key; and
  after the operating encryption key is extracted, notifying the third controller to initiate transmitting the enumeration information to the host,
wherein encrypting the data from the host comprises encrypting, the data from the host, using the operating encryption key,
wherein decrypting the data from the memory comprises decrypting, the data from the memory, using the operating encryption key, and
wherein when the portable storage device is caused to be locked, the second controller is configured to cause deleting the operating encryption key from the second controller.

19. An apparatus, comprising:
a casing;
a memory disposed within the casing and configured to store encrypted data;
an input device disposed at or on the casing and configured to receive a security access code to facilitate unlocking of the apparatus;
a first controller disposed within the casing and coupled to the input device, the first controller configured to cause:
  verifying the security access code received at the input device of the apparatus, against an access code stored in the first controller;
  when the security access code is verified,
    retrieving an encryption key, which has been generated internally within the first controller and stored in the first controller prior to receipt of the security access code by the input device, wherein the encryption key is not generated or provided by a host, a user or a second controller; and
    providing the encryption key; and
  when the apparatus is locked, retaining the encryption key only in the first controller;

the second controller disposed within the casing and coupled to the first controller and the memory, the second controller configured to cause:
  after the security access code is verified:
    receiving the encryption key from the first controller, via a side interface coupled to the first controller;
    encrypting, data from the host, based on an operating encryption key associated with the encryption key, and providing the encrypted data to the memory; and
    decrypting, data from the memory, based on the operating encryption key, and providing the decrypted data toward the host; and
  when the apparatus is caused to be locked, deleting the encryption key and the operating encryption key from the second controller; and
a third controller disposed within the casing and coupled to the first controller and the second controller, the third controller configured to cause:
  after the security access code is verified:
    transmitting enumeration information of the apparatus to the host via a first interface of the third controller; and
    transferring the data from the host to the second controller, via a second interface of the third controller,
wherein:
the first interface is of a first type,
the side interface is of a second type,
the first type is different from the second type,
the apparatus is separate and distinct from the host,
the apparatus is removable from the host, and
the first controller is separate and distinct from the second controller.

20. The apparatus of claim 19,
wherein the second controller comprises the side interface, and
wherein the second controller is configured to cause:
  extracting the operating encryption key based on the encryption key; and
  after the operating encryption key is extracted, notifying the third controller to initiate transmitting the enumeration information to the host to allow the apparatus to be recognized by the host.

* * * * *